US009929869B2

(12) United States Patent
Jennings

(10) Patent No.: US 9,929,869 B2
(45) Date of Patent: Mar. 27, 2018

(54) METHODS, APPARATUSES, AND COMPUTER-READABLE MEDIA FOR PROVIDING A COLLABORATION LICENSE TO AN APPLICATION FOR PARTICIPANT USER DEVICE(S) PARTICIPATING IN AN ON-LINE COLLABORATION

(75) Inventor: Terry Don Jennings, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 397 days.

(21) Appl. No.: 13/281,753

(22) Filed: Oct. 26, 2011

(65) Prior Publication Data
US 2013/0111355 A1  May 2, 2013

(51) Int. Cl.
*G06F 15/16* (2006.01)
*H04L 12/18* (2006.01)
(Continued)

(52) U.S. Cl.
CPC ..... *H04L 12/1822* (2013.01); *H04N 21/2541* (2013.01); *H04N 21/4788* (2013.01);
(Continued)

(58) Field of Classification Search
CPC ......... H04L 29/06401; H04L 29/06414; H04L 29/08945; H04L 12/1822; H04L 65/4015;
(Continued)

(56) References Cited

U.S. PATENT DOCUMENTS 5,905,860 A * 5/1999 Olsen et al. ............... 726/27
6,430,567 B2 * 8/2002 Burridge ................... 707/781
(Continued)

FOREIGN PATENT DOCUMENTS

EP    1898552 A2 *  3/2008
EP    2290524 A2    3/2011

OTHER PUBLICATIONS

Rosenberg, J., "A Framework for Conferencing with the Session Initiation Protocol (SIP)". Cisco Systems. Network Working Group, Request for Comments (RFC) 4353. http://tools.ietf.org/pdf/rfc4353.pdf. Feb. 2006. 30 pages.
(Continued)

*Primary Examiner* — Farzana Huq
(74) *Attorney, Agent, or Firm* — Sheridan Ross P.C.

(57) ABSTRACT

Methods, apparatuses, and computer-readable media for providing a collaboration license to an application for participant user device(s) participating in an on-line collaboration are disclosed. In one embodiment, a method is provided for licensing at least one application. The method includes transmitting a license request for at least one collaboration license. The collaboration license authorizes usage of at least one application on at least one participant user device participating in a collaboration. The collaboration may include at least one collaborative communication session among a plurality of participant user devices. The method further includes receiving the at least one collaboration license. Apparatuses and computer-readable media having instructions for providing the method are also disclosed. These may allow participant(s) of a collaboration to initiate and use an application during the collaboration that the participant(s) were not licensed to use when the participant(s) joined the collaboration.

18 Claims, 23 Drawing Sheets

(51) Int. Cl.

| | | |
|---|---|---|
| *H04N 21/254* | (2011.01) | |
| *H04N 21/4788* | (2011.01) | |
| *H04N 21/6334* | (2011.01) | |
| *H04N 21/81* | (2011.01) | |
| *H04L 29/06* | (2006.01) | |
| *H04L 29/08* | (2006.01) | |

(52) U.S. Cl.
CPC ..... *H04N 21/6334* (2013.01); *H04N 21/8173* (2013.01); *H04L 63/0823* (2013.01); *H04L 67/14* (2013.01)

(58) Field of Classification Search
CPC . H04L 65/1066; H04L 65/00; H04L 41/5093; H04L 63/065; H04L 63/10; H04L 2463/101
USPC .......................................... 709/203, 227, 229
See application file for complete search history.

(56) References Cited

U.S. PATENT DOCUMENTS

| | | | |
|---|---|---|---|
| 7,421,469 B1* | 9/2008 | Liu .................. | G06Q 10/10 709/204 |
| 7,734,551 B1* | 6/2010 | Lindeman .............. | G06F 21/10 705/59 |
| 7,774,281 B2* | 8/2010 | Okamoto et al. .............. | 705/59 |
| 8,407,289 B2* | 3/2013 | Chen .................. | G06F 21/6218 370/260 |
| 8,972,485 B1 | 3/2015 | French et al. | |
| 2001/0011253 A1* | 8/2001 | Coley ..................... | G06F 21/10 705/59 |
| 2001/0016872 A1 | 8/2001 | Kusuda | |
| 2002/0010744 A1* | 1/2002 | Prell ..................... | G06F 9/5061 709/205 |
| 2002/0138317 A1* | 9/2002 | Mok ..................... | G06Q 10/06 700/44 |
| 2002/0198846 A1* | 12/2002 | Lao .................. | 705/54 |
| 2003/0070072 A1* | 4/2003 | Nassiri ..................... | H04L 9/32 713/168 |
| 2003/0167304 A1* | 9/2003 | Zhu et al. ..................... | 709/205 |
| 2003/0167339 A1* | 9/2003 | Zhu et al. ..................... | 709/238 |
| 2004/0010471 A1* | 1/2004 | Lenard .................. | G06F 21/105 705/59 |
| 2005/0149340 A1* | 7/2005 | Murakami et al. .............. | 705/1 |
| 2005/0165859 A1* | 7/2005 | Geyer ..................... | G06Q 10/10 |
| 2005/0257209 A1* | 11/2005 | Adams .................. | G06F 12/1458 717/168 |
| 2006/0021025 A1* | 1/2006 | Okamoto et al. .............. | 726/17 |
| 2006/0117382 A1* | 6/2006 | Karabulut .......... | H04L 63/0823 726/10 |
| 2008/0165391 A1 | 7/2008 | Chen | |
| 2008/0168140 A1* | 7/2008 | Chen et al. .................. | 709/205 |
| 2008/0262968 A1* | 10/2008 | Saxena et al. .................. | 705/51 |
| 2009/0086957 A1* | 4/2009 | Kelley .................. | H04M 3/567 379/265.09 |
| 2009/0089881 A1* | 4/2009 | Indenbom ............. | G06F 21/128 726/26 |
| 2010/0031373 A1* | 2/2010 | Hamid ..................... | G06F 21/10 726/29 |
| 2010/0057703 A1 | 3/2010 | Brandt et al. | |
| 2010/0061538 A1 | 3/2010 | Coleman et al. | |
| 2010/0094630 A1 | 4/2010 | Yoakum | |
| 2010/0174789 A1 | 7/2010 | Pena et al. | |
| 2010/0299762 A1* | 11/2010 | Jouret et al. .................... | 726/28 |
| 2011/0055329 A1 | 3/2011 | Abt, Jr. et al. | |
| 2011/0238759 A1 | 9/2011 | Spataro et al. | |
| 2011/0271129 A1* | 11/2011 | Flannagan .......... | H04L 12/1822 713/323 |
| 2012/0047207 A1* | 2/2012 | Callanan .......... | G06F 17/30864 709/204 |
| 2012/0263168 A1* | 10/2012 | Petrack ............... | H04M 7/1205 370/352 |
| 2012/0275349 A1 | 11/2012 | Boyer et al. | |
| 2012/0275444 A1* | 11/2012 | Shahsavari ......... | H04L 63/0876 370/338 |
| 2013/0073619 A1* | 3/2013 | Tumuluri ............... | G06T 19/20 709/204 |

OTHER PUBLICATIONS

Roach, A. B., "Session Initiated Protocol (SIP)—Specific Event Notification," Network Working Group, Request for Comments: 3265, Jun. 2002, 39 pages.

Fox, G. et al., "Global Multimedia Collaboration System," Concurrency and Computation: Practice and Experience, vol. 16 Issue 5, Mar. 26, 2004, 6 pages.

Johnston, A., et al., "Session Initiation Protocol (SIP) Call Control—Conferencing for User Agents," Request for Comments (RFC) 4579, Internet Engineering Task Force (IETF) Network Working Group, Aug. 2006, http://tools.ietf.org/pdf/rfc4579.pdf, 44 pages.

Rosenberg, J., et al., "A Session Initiation Protocol (SIP) Event Package for Conference State," Request for Comments (RFC) 4575, Internet Engineering Task Force (IETF) Network Working Group, Aug. 2006, http://tools.ietf.org/pdf/rfc4575.pdf, 49 pages.

Rosenberg, J., et al., "SIP: Session Initiation Protocol," Request for Comments (RFC) 3261, Internet Engineering Task Force (IETF) Network Working Group, Jun. 2002, http://tools.ietf.org/pdf/rfc3261.pdf, 270 pages.

Mitchell, J. et al., "Agile Management of Dynamic Collaboration," Date Unknown, 29 pages.

Author Unknown, "Series T: Terminals for Telematic Services, Data Protocols for Multimedia Conferencing (T.128)," International Telecommunications Union (ITU-T), Jun. 2008, 204 pages.

Ohmori, T. et al., "Cooperative Control for Sharing Applications Based on Distributed Multiparty Desktop Conferencing System: MERMAID," Proceedings of the International Conference on Communications, Jun. 14, 1992, pp. 1069-1075.

European Search Report for European Patent Application No. 12183565.6, dated Feb. 6, 2014, 7 pages.

Non-final Office Action for U.S. Appl. No. 13/228,261 dated Oct. 21, 2013, 17 pages.

Final Office Action for U.S. Appl. No. 13/228,261, dated May 23, 2014, 18 pages.

Advisory Action for U.S. Appl. No. 13/228,261, dated Jul. 31, 2014, 3 pages.

Non-Final Office Action for U.S. Appl. No. 13/228,261, dated Nov. 19, 2014, 18 pages.

Final Office Action for U.S. Appl. No. 13/228,261, dated Nov. 5, 2015, 18 pages.

Advisory Action for U.S. Appl. No. 13/228,261, dated Feb. 12, 2016, 3 pages.

Non-Final Office Action for U.S. Appl. No. 13/228,261, dated Mar. 24, 2016, 20 pages.

\* cited by examiner

| | |
|---|---|
| USAGE OF THE APPLICATION(S) ON THE PARTICIPANT USER DEVICE(S) FOR THE DURATION OF THE COLLABORATION? 534 | [AUTHORIZE/FORBID/ IRRELEVANT] 536 |
| USAGE OF THE APPLICATION(S) ON THE PARTICIPANT USER DEVICE(S) FOR ONLY THE DURATION OF THE COLLABORATION? 538 | [AUTHORIZE/FORBID/ IRRELEVANT] 540 |
| USAGE OF THE APPLICATION(S) WHEN STARTED DURING THE COLLABORATION AFTER THE COLLABORATION HAS ENDED UNTIL EXECUTION OF THE APPLICATION(S) IS TERMINATED? 542 | [AUTHORIZE/FORBID/ IRRELEVANT] 544 |
| USAGE OF THE APPLICATION(S) 546 BY PARTICIPANT USER DEVICE(S) WHICH ARE NOT MODERATING THE COLLABORATION? | [AUTHORIZE/FORBID/ IRRELEVANT] 548 |
| REQUESTED MAXIMUM NUMBER OF LICENSE INSTANCES? 550 | INTEGER [0..N] 552 |
| REQUESTED MAXIMUM NUMBER OF LICENSE INSTANCES PER COLLABORATION? 554 | INTEGER [0..N] 556 |
| REQUESTED MAXIMUM NUMBER OF LICENSE INSTANCES THAT MAY BE BORROWED BY THE PARTICIPANT USER DEVICE(S) 558 | INTEGER [0..N] 560 |
| REQUESTED LICENSE EXPIRATION DATE 562 | [NONE/DD-MM-YYYY] 564 |

*FIG. 5B*

| | | 52 |
|---|---|---|
| USAGE OF THE APPLICATION(S) ON THE PARTICIPANT USER DEVICE(S) FOR THE DURATION OF THE COLLABORATION? 634 | [AUTHORIZE/FORBID/ IRRELEVANT] 636 | |
| USAGE OF THE APPLICATION(S) ON THE PARTICIPANT USER DEVICE(S) FOR ONLY THE DURATION OF THE COLLABORATION? 638 | [AUTHORIZE/FORBID/ IRRELEVANT] 640 | |
| USAGE OF THE APPLICATION(S) WHEN STARTED DURING THE COLLABORATION AFTER THE COLLABORATION HAS ENDED UNTIL EXECUTION OF THE APPLICATION(S) IS TERMINATED? 642 | [AUTHORIZE/FORBID/ IRRELEVANT] 644 | |
| USAGE OF THE APPLICATION(S) 646 BY PARTICIPANT USER DEVICE(S) WHICH ARE NOT MODERATING THE COLLABORATION? | [AUTHORIZE/FORBID/ IRRELEVANT] 648 | |
| MAXIMUM NUMBER OF LICENSE INSTANCES? 650 | INTEGER [0..N] 652 | |
| MAXIMUM NUMBER OF LICENSE INSTANCES PER COLLABORATION? 654 | INTEGER [0..N] 656 | |
| MAXIMUM NUMBER OF LICENSE INSTANCES THAT MAY BE BORROWED BY THE PARTICIPANT USER DEVICE(S) 658 | INTEGER [0..N] 660 | |
| LICENSE EXPIRATION DATE? 662 | [NONE/DD-MM-YYYY] 664 | |
| AUTHORIZING DIGITAL SIGNATURE 666 | | |

*FIG. 6B*

```
<CollaborationLicense>
    <ApplicationIdentifiers>
        <ApplicationIdentifier>
            <ApplicationExecutable>wordProcessor.exe</ApplicationExecutable>
            <ApplicationVersion>3.X</ApplicationVersion>
        <ApplicationIdentifier>
    </ApplicationIdentifiers>
    <CollaborationIdentifier>
        <CollaborationController>CollaborationController1.company.com
        </CollaborationController>
        <CollaborationInstance>100</CollaborationInstance>
    </CollaborationIdentifier>
    <UsageOfTheApplicationsOnTheParticipantUserDevicesParticipatingInTheCollaboration>
        authorize
    </UsageOfTheApplicationsOnTheParticipantUserDevicesParticipatingInTheCollaboration>
    <UsageOfTheApplicationsOnOnlyTheParticipantUserDevicesParticipatingInTheCollaboration>
        authorize
    </UsageOfTheApplicationsOnOnlyTheParticipantUserDevicesParticipatingInTheCollaboration>
    <UsageOfTheApplicationsOnAnyDevicesNotParticipatingInTheCollaboration>
        forbid
    </UsageOfTheApplicationsOnAnyDevicesNotParticipatingInTheCollaboration>
    <UsageOfTheApplicationsOnTheParticipantUserDevicesAfterTheCollaborationHasEnded>
        forbid
    </UsageOfTheApplicationsOnTheParticipantUserDevicesAfterTheCollaborationHasEnded>
    <UsageOfTheApplicationsOnTheParticipantUserDevicesAfterTheParticipantUserDevicesCeaseParticipatingInTheCollaboration>
        forbid
    </UsageOfTheApplicationsOnTheParticipantUserDevicesAfterTheParticipantUserDevicesCeaseParticipatingInTheCollaboration>
    <UsageOfTheApplicationsOnTheParticipantUserDevicesWithinTheCollaboration>
        authorize
    </UsageOfTheApplicationsOnTheParticipantUserDevicesWithinTheCollaboration>
    <UsageOfTheApplicationsOnTheParticipantUserDevicesOutsideTheCollaboration>
        forbid
    </UsageOfTheApplicationsOnTheParticipantUserDevicesOutsideTheCollaboration>
```

*FIG. 7A*

```xml
<UsageOfTheApplicationsOnTheParticipantUserDevicesForTheDurationOfTheCollaboration>
          authorize
     </UsageOfTheApplicationsOnTheParticipantUserDevicesForTheDurationOfThe
Collaboration>
     <UsageOfTheApplicationsOnTheParticipantUserDevicesForOnlyTheDurationOfThe
Collaboration>
          authorize
     </UsageOfTheApplicationsOnTheParticipantUserDevicesForOnlyTheDurationOfThe
Collaboration>
     <UsageOfTheApplicationsWhenStartedDuringTheCollaborationAndAfterThe
CollaborationHasEndedUntilExecutionOfTheApplicationsAreTerminated>
          forbid
     </UsageOfTheApplicationsWhenStartedDuringTheCollaborationAndAfterThe
CollaborationHasEndedUntilExecutionOfTheApplicationsAreTerminated>
     <UsageOfTheApplicationsByParticipantUserDevicesWhichAreNotModeratingThe
Collaboration>
          authorize
     </UsageOfTheApplicationsByParticipantUserDevicesWhichAreNotModeratingThe
Collaboration>
     <MaximumNumberOfLicenseInstances>100</MaximumNumberOfLicenseInstances>
     <MaximumNumberOfLicenseInstancesPerCollaboration>100</MaximumNumberOfLicense
InstancesPerCollaboration>
     <MaximumNumberOfLicenseInstancesThatMayBeBorrowedByTheParticipantUserDevices>
10</MaximumNumberOfLicenseInstancesThatMayBeBorrowedByTheParticipantUserDevices>
     <LicenseExpirationDate>01-01-2050</LicenseExpirationDate>
     <AuthorizingDigitalSignature>tGIRRALzqcupwSeKs+2Ca9KqsKOENXaDP2X7id2PooAR23p
1991eeWe==</AuthorizingDigitalSignature>
</CollaborationLicense>
```

*FIG. 7B*

METHODS, APPARATUSES, AND COMPUTER-READABLE MEDIA FOR PROVIDING A COLLABORATION LICENSE TO AN APPLICATION FOR PARTICIPANT USER DEVICE(S) PARTICIPATING IN AN ON-LINE COLLABORATION

RELATED APPLICATION

This application is related to U.S. patent application Ser. No. 13/228,261 filed Sep. 8, 2011, entitled "METHODS, APPARATUSES, AND COMPUTER-READABLE MEDIA FOR INITIATING AN APPLICATION FOR PARTICIPANTS OF A CONFERENCE," which is hereby incorporated herein by reference in its entirety.

BACKGROUND

Field of the Disclosure

The technology of the disclosure relates to on-line collaborations, such as conferences (including, as non-limiting examples, audio conferences, video conferences, and/or text chat conferences) and waves.

Technical Background

Collaborations, such as conference calls, allow two or more people to communicate. Typically, to setup a collaboration among multiple participants, a meeting organizer schedules a meeting time, and reserves a conference bridge for availability during that time. The meeting organizer distributes the conference bridge phone number for the meeting. At the appropriate time, participants dial the conference bridge phone number to join the collaboration.

Though collaborations may allow a plurality of participants to remotely communicate, participants of such collaborations may encounter various impediments to productivity. For example, if a collaboration participant wishes the participants of the collaboration to start a particular application to facilitate or be used during the collaboration, problems may be encountered. For example, some collaboration participants may not have the application available on their personal computer. The collaboration participant may not have conceived of a need to use the application for the collaboration until participation in the collaboration began. Thus, there may have been insufficient notice for an information technology (IT) department to have obtained a license and/or to have installed the application on personal computers of the collaboration participants before the collaboration began. Furthermore, the members of the collaboration may work for different organizations within a company or for different companies altogether. Thus, there may be no common information technology (IT) department for providing a licensed application for all the collaboration participants before the collaboration begins. Different collaboration participants may have different versions of a same application installed on their personal computers. The different application versions may be incompatible. Some members of a collaboration may not have a valid software license to execute the application. Some members of a collaboration may not have a valid software license to execute a certain version of the application.

One approach is for a collaboration participant to share their desktop with other participants of the collaboration. In this manner, the collaboration participant may present one instance of a licensed application to the other participants of a collaboration. The collaboration participant may share her desktop in two ways: read-only, or with full access. If the shared desktop is shared read-only, other participants may not collaboratively manipulate the application. If the shared desktop is shared with full access, collaboration participants may also view or change other portions of her shared desktop. All collaboration participants may not have the same screen sharing application software and/or version on their personal computer. Firewalls may restrict screen sharing applications running on the personal computers of the participants from communicating with one another. Furthermore, screen sharing only provides one instance of an application. Accordingly, screen sharing also does not address instances where greater interactivity or productivity could be achieved with multiple application instances for the participants of the collaboration. Furthermore, a participant or participant user device may not be licensed to provide, perform, and/or display (for example, publically or non-publically) a personally licensed or other licensed copy of an application for group use. In this regard, for example, a participant may not be licensed to provide, perform, and/or display an application for use by other participants of a collaboration using screen sharing.

SUMMARY OF THE DETAILED DESCRIPTION

Embodiments disclosed in the detailed description include methods, apparatuses, and computer-readable media for providing a collaboration license to an application for participant user device(s) participating in an on-line collaboration (hereinafter "collaboration"). A collaboration license authorizes the use of an application on at least one participant user device participating in a collaboration. As a non-limiting example, a collaboration license may authorize a user device for using an application if the user device is a participant user device participating in a collaboration for which the collaboration license was issued. As a further non-limiting example, the collaboration license may not authorize a user device to use an application if the user device is not a participant user device participating in the collaboration for which the collaboration license was issued. As a result, the participants of the collaboration may collaboratively use a same application (as a non-limiting example, a same application version and/or a compatible application version) during the collaboration that those participants otherwise would not have been able to use during the collaboration. Enabling the participants of the collaboration to use a same application during the collaboration may increase the productivity of the participants during the collaboration.

In one embodiment, a method is provided for licensing at least one application. The method includes transmitting a license request for at least one collaboration license authorizing usage of at least one application on at least one participant user device participating in a collaboration. The collaboration may include at least one collaborative communication session among a plurality of participant user devices. The license request may be transmitted from a collaboration controller to a licensing server. The method further includes receiving the at least one collaboration license authorizing usage of the at least one application on the at least one participant user device participating in the collaboration. The collaboration license may be received at the collaboration controller from the licensing server. This method may provide just-in-time delivery of at least one license to one or more participants of a collaboration. This method may allow at least one participant of a collaboration the ability to initiate and use an application during the collaboration that the at least one participant was not licensed to use when the at least one participant joined the collaboration. As such, the method may improve the productivity of one or more participants of a collaboration during the collaboration, as the method provides the one or more participants of the collaboration an ability to start and use an application during a collaboration that the one or more participants of the collaboration otherwise may not have been able to use during the collaboration. The method may provide one or more participants a reduced amount of time to become licensed to initiate and use an application that the one or more participants would like to use during a collaboration, as a non-limiting example, when the one or more participants were unaware of a need or desire to use the application during the collaboration when the one or more participants joined the collaboration. The method may result in increased collaboration and/or productivity for the participants of a collaboration. The method provides an ability for participants of a collaboration who do not work for a same organization to become licensed to use a same application during a collaboration and to use that application during the collaboration.

In another embodiment, a collaboration controller is disclosed. The collaboration controller includes a communications interface adapted to interface with a network. The collaboration controller also includes a control system coupled to the communications interface. The collaboration controller is configured to transmit a license request for at least one collaboration license. A collaboration license authorizes usage of at least one application on at least one participant user device participating in a collaboration. The collaboration comprises at least one collaborative communication session among a plurality of participant user devices. The license request may be transmitted from the collaboration controller to a licensing server. The collaboration controller is further configured to receive the at least one collaboration license authorizing usage of the at least one application on the at least one participant user device participating in the collaboration. The at least one collaboration license may be received at the collaboration controller from the licensing server.

In another embodiment, a computer-readable medium is disclosed. The computer-readable medium has stored thereon computer executable instructions to cause an electronic device to implement a method for licensing at least one application. The computer executable instructions include transmitting a license request for at least one collaboration license authorizing usage of the at least one application on at least one participant user device participating in a collaboration. The collaboration may include at least one collaborative communication session among a plurality of participant user devices. The license request may be transmitted from a collaboration controller to a licensing server. The computer executable instructions further include receiving the at least one collaboration license authorizing usage of the at least one application on the at least one participant user device participating in the collaboration. The at least one collaboration license may be received at the collaboration controller from the licensing server.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The accompanying drawing figures incorporated in and forming a part of this specification illustrate several aspects of the disclosure, and together with the description serve to explain the principles of the disclosure.

FIGS. 5A and 5B depict an exemplary license request for requesting a collaboration license;

FIGS. 6A and 6B depict an exemplary collaboration license;

FIGS. 7A and 7B depict another exemplary collaboration license in accordance with FIGS. 6A and 6B;

DETAILED DESCRIPTION

Figure 1:
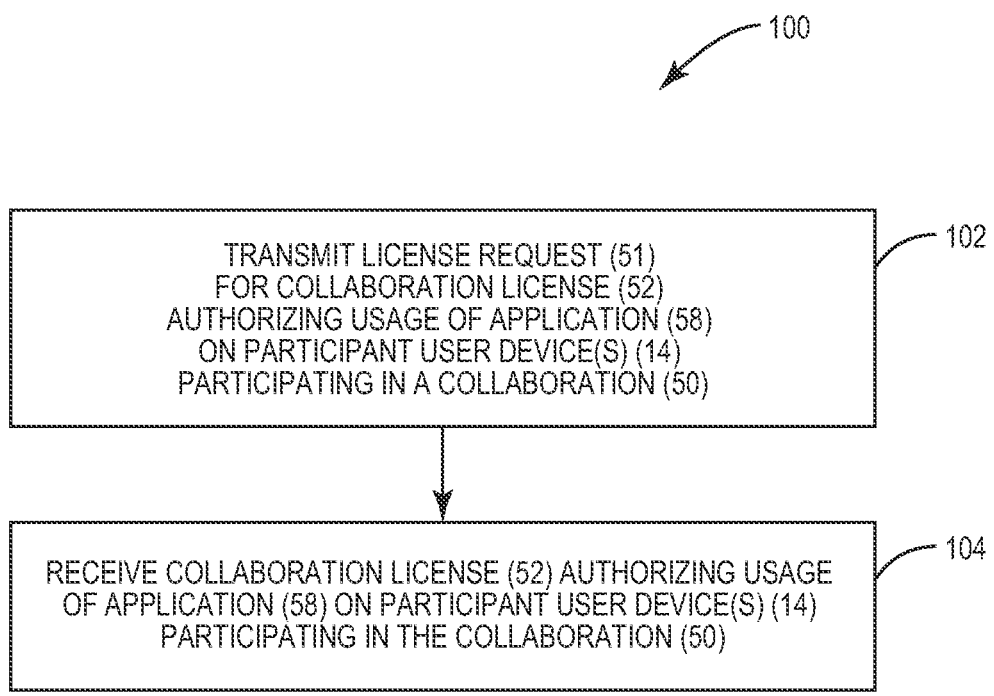
FIG. 1 is an exemplary flowchart illustrating an exemplary method for licensing an application.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, apparatuses, and computer-readable media for providing a collaboration license to an application for participant user device(s) participating in an on-line collaboration (hereinafter "collaboration"). A collaboration license authorizes the use of an application on at least one participant user device participating in a collaboration. As a non-limiting example, a collaboration license may authorize a user device for using an application if the user device is a participant user device participating in a collaboration for which the collaboration license was issued. As a further non-limiting example, the collaboration license may not authorize a user device to use an application if the user device is not a participant user device participating in the collaboration for which the collaboration license was issued. As a result, the participants of the collaboration may collaboratively use a same application (as a non-limiting example, a same application version and/or a compatible application version) during the collaboration that those participants otherwise would not have been able to use during the collaboration. Enabling the participants of the collaboration to use a same application during the collaboration may increase the productivity of the participants during the collaboration.

In one embodiment, a method is provided for licensing at least one application. The method includes transmitting a license request for at least one collaboration license authorizing usage of at least one application on at least one participant user device participating in a collaboration. The collaboration may include at least one collaborative communication session among a plurality of participant user devices. The license request may be transmitted from a collaboration controller to a licensing server. The method further includes receiving the at least one collaboration license authorizing usage of the at least one application on the at least one participant user device participating in the collaboration. The collaboration license may be received at the collaboration controller from the licensing server.

The method may result in increased interactivity and/or productivity for the participants of a collaboration. This method may allow at least one participant of a collaboration the ability to initiate and use an application during the collaboration that the at least one participant was not licensed to use when the at least one participant joined the collaboration. The method can provide the ability for participants of a collaboration who do not work for a same organization to become licensed to use a same application during a collaboration and to use that application during the collaboration. This method may provide just-in-time delivery of at least one license to one or more participants of a collaboration. The method may provide one or more participants a reduced amount of time to become licensed to initiate and use an application that the one or more participants would like to use during a collaboration. This may benefit one or more participants who were unaware of a need or desire to use the application during the collaboration when the one or more participants joined the collaboration.

FIG. 1 depicts a high-level flowchart illustrating an exemplary method 100 for licensing at least one application 58. The method comprises transmitting a license request 51 for at least one collaboration license 52 authorizing usage of at least one application 58 on at least one participant user device 14 participating in a collaboration 50 (block 102). The collaboration 50 may comprise at least one collaborative communication session among a plurality of participant user devices 14. The license request 51 may be transmitted from a collaboration controller 12 (also referred to herein as a "collaboration server"). The license request 51 may be transmitted to a licensing server 80, 82 (also referred to herein as a "license server"). The method further includes receiving the at least one collaboration license 52 authorizing usage of the at least one application 58 on the at least one participant user device 14 participating in the collaboration 50 (block 104). The collaboration license 52 may be received at the collaboration controller 12 from the licensing server 80, 82.

In a further embodiment, license request 51 may also be transmitted from a participant user device 14. License request 51 may be received at the collaboration controller 12 from the participant user device 14. Thereafter, collaboration license 52 may be received at the participant user device 14 from the collaboration controller 12. Alternatively, license request 51 may be received at the licensing server 80, 82 from the participant user device 14. Thereafter collaboration license 52 may be received at the participant user device 14 from the licensing server 80, 82.

Figure 2:
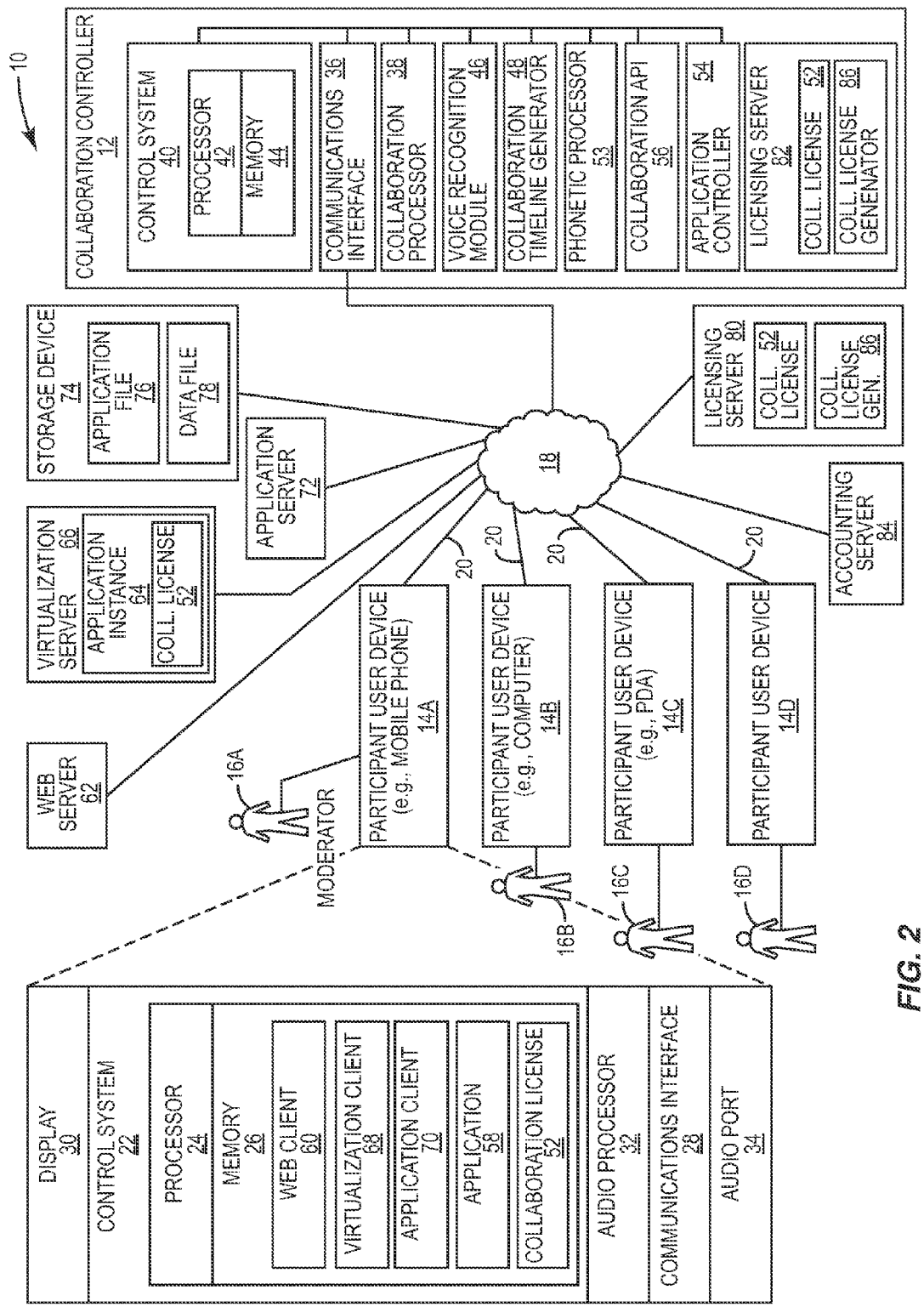
FIG. 2 is a block diagram illustrating a system in which the application licensing embodiments disclosed herein may be practiced.

Before discussing further embodiments of methods, apparatuses, and computer-readable media for licensing at least one application, an exemplary system in which these functions may be provided is first discussed. In this regard, FIG. 2 is a block diagram illustrating a system 10 in which embodiments disclosed herein may be practiced. The system 10 includes a plurality of processing devices, such as a collaboration controller 12 and a plurality of participant user devices 14A-14D (generally, participant user device 14 or participant user devices 14). The participant user devices 14A-14D are used by corresponding participants 16A-16D (generally, participant 16 or participants 16) in a collaboration 50. A collaboration 50 is a session in which information is exchanged between participants without a need for separate and repeated message initiation triggering by the participants. A collaboration 50 may be a real-time collaboration and/or a non-real-time collaboration. As used herein, the term "real-time" is used to mean "without perceivable delay" for conversing participants of the collaboration 50 and/or "within a tolerable delay" for conversing participants of the collaboration 50.

As a non-limiting example, the collaboration 50 may be an on-line collaboration. An on-line collaboration is communicated via a network, such network 18. As a non-limiting example, the network may be a computer network. In one embodiment, the collaboration 50 may be a conference, such as an audio conference, a video conference, a text chat conference, and/or a combination of any of these. As further non-limiting examples, the information exchanged may be audio information, video information, text chat information (as a non-limiting example, text messaging information), and/or a combination of any of these. For purposes of illustration, embodiments described herein may be discussed in the context of a collaboration 50 in which audio information is exchanged; however, the embodiments are not limited to the exchange of audio information.

As another non-limiting example, the collaboration 50 may be a wave. A wave is a persistent session among a plurality of participants allowing the participants to communicate in real-time (as a non-limiting example, synchronously) and in non-real-time (as a non-limiting example, asynchronously). As non-limiting examples, a wave may be a Google® wave, an Apache® wave, a SAP® 12sprints™ or an SAP® StreamWork™.

In one embodiment, the participant user device 14 is a device capable of sending and receiving voice signals, and is capable of providing a collaboration application for display and/or control to a participant 16 as further described below. The participant user device 14 may comprise, as non-limiting examples, a computer; a personal digital assistant (PDA); a mobile phone, such as an Apple® iPhone®, a Google® Android® phone, or the like.

While for purposes of illustration embodiments are described herein in the context of a single participant user device 14 that is capable of both audio processing and collaboration application functionality, the embodiments are not limited to the use of a single processing device. One or more of the participants may participate in the collaboration 50 with multiple processing devices, one of which (as a non-limiting example, a telephone) handles and otherwise processes the audio aspects of the collaboration session, and another of which (as a non-limiting example, a computer) handles the collaboration application aspects of the collaboration 50. In particular, a participant may use a conventional telephone to dial into a particular collaboration bridge (as a non-limiting example, a conference bridge), and may also direct a program on a computer, such as a web browser program, to a particular location, such as a particular website, in order to communicatively couple the computer to the collaboration controller 12 for participating in the collaboration 50. Of course, the participant user device 14 may also comprise a single processing device, such as a computer with a microphone and headset, or a smartphone, such that both the audio aspects and the collaboration application aspects of the embodiments described herein are handled by a single processing device.

The participant user devices 14 are communicatively coupled to the collaboration controller 12 and to one another via one or more networks 18. While only a single network 18 is illustrated in FIG. 1, it will be appreciated that communications may travel over multiple networks, such as a private local area network (LAN) in a participant's house, a public access network, an enterprise network, and so on, between the processing devices. The participant user devices 14A-14D may connect to the network 18 via any suitable network access paths 20, such as, as non-limiting examples, telephony technology, digital subscriber line technology, cable modem technology, cellular technology, Ethernet, Wi-Fi®, Bluetooth®, WiMax®, wireless broadband technology, or the like. Data, such as control signals, audio signals, and the like, are typically carried over a network access path 20.

An exemplary participant user device 14, such as the participant user device 14A, includes a control system 22, which may include a processor 24 and a random access memory (RAM) 26, for controlling the overall operation of the participant user device 14A, and for executing collaboration applications as discussed in greater detail herein.

The participant user device 14A may also include a communications interface 28 that is adapted to communicate with the network 18 to facilitate communications between the participant user device 14A and external devices, such as the collaboration controller 12. The participant user device 14A also includes, or is coupled to, a display 30 upon which visual artifacts of collaboration applications may be rendered, and via which, with the aid of an input device such as a mouse, keyboard, or touch screen interface, it is possible to interact with collaboration applications. The participant user device 14A also preferably includes a media processor, such as an audio processor 32, which generates a media stream that includes voice signals of the participant 16A and sends the media stream to the collaboration controller 12 continuously during the collaboration 50, or continuously for as long as the participant user device 14A detects that the participant 16A is speaking The media stream is typically, although not necessarily, a digitized data stream that is generated by the audio processor 32 and represents the voice signals of the participant 16A. Over the course of a collaboration 50, the media stream of any particular participant 16 may be discontinuous, in that the media stream may be generated only when the participant 16 is actually speaking As used herein, the phrase "incoming media stream" will refer to a media stream that is sent from a participant user device 14 to the collaboration controller 12, and the phrase "outgoing media stream" will refer to a media stream that is sent from the collaboration controller 12 to a participant user device 14.

For purposes of illustration only, certain embodiments herein will be discussed in the context of a telephone collaboration, and the media stream is thus an audio stream. However, the embodiments herein are not limited to media streams that contain only audio streams, and are equally applicable to media streams that include video only, media streams that including both video and audio, media streams that include text chat (as a non-limiting example, text messaging) only, and to media streams including any combination of audio, video, text chat, or other media.

The audio processor 32 receives outgoing media streams from the collaboration controller 12 and provides the outgoing media streams to an audio port 34 to which an audio device, such as a headset or speakers, may be coupled. Alternatively, if the participant user device 14A is a smartphone, as a non-limiting example, the audio device may be integral with the participant user device 14A.

Each of the participant user devices 14 establishes a session with the collaboration controller 12. A collaboration 50 may comprise any type of session or connection between a respective participant user device 14 and the collaboration controller 12 that enables the transmission of a media stream from the respective participant user device 14 to the collaboration controller 12, and the receipt of a media stream from the collaboration controller 12 to the respective participant user device 14, irrespective of the underlying physical infrastructure used to carry the media stream, or the particular protocol used to establish the communication session between the respective participant user device 14 and the collaboration controller 12. As non-limiting examples, suitable protocols may include Transport Control Protocol (TCP), User Datagram Protocol (UDP), Internet Protocol (IP), Hypertext Transport Protocol (HTTP), Session Initiation Protocol (SIP), International Telecommunication Union Telecommunications (ITU-T) H.323, Media Gateway Control Protocol (MGCP), conventional public switched telephone network (PSTN) signaling, Wave Federation Protocol (WFP) signaling, Internet Relay Chat (IRC) signaling, Short Message Service (SMS) signaling, Extensible Markup Language (XML) signaling or the like.

If implemented with support for the SIP protocol, as a non-limiting example, collaboration controller 12 may be implemented as a user agent or a back-to-back user agent (B2BUA). A network access path 20, such as a wired or wireless access path, typically couples a participant user device 14 to the communication network 18. Certain embodiments disclosed herein are illustrated using SIP protocol signaling and novel extensions to SIP protocol signaling. However, embodiments disclosed herein are not limited to using the SIP protocol. The embodiments disclosed herein may be provided as an extension of any protocol, signaling, or messaging that may be used for collaboration and/or conferencing.

The collaboration controller 12 includes a communications interface 36 that is adapted to communicate with the communication network 18, and can comprise any suitable combination of hardware and/or software necessary to receive incoming media streams from the participant user devices 14, and to send outgoing media streams to the participant user devices 14.

The collaboration controller 12 also includes a collaboration processor 38 that may establish a collaboration 50 between the participants 16. The collaboration processor 38 includes a mixer that enables the collaboration processor 38 to mix or combine multiple media streams and provide a mixed outgoing media stream to one or more participant user devices 14. During a collaboration 50, the collaboration processor 38 operates to generate a collaboration media stream that comprises the media streams of the participants 16 during a particular period of time during the collaboration session. As a non-limiting example, the collaboration media stream may comprise a plurality of video streams of all the participants if the media stream is a video stream. The collaboration media stream may comprise a combination of a combined audio stream and a plurality of video streams where the media streams include both audio and video, as a non-limiting example.

The collaboration controller 12 also includes a control system 40, which may include a processor 42 and a memory 44, for controlling the overall operation of the collaboration controller 12. A voice recognition module 46 may enable one or more of the participants 16 to issue commands during a collaboration 50, such as a command issued by one of the participants 16 to initiate an application for all participants 16 of the collaboration 50. A collaboration timeline generator 48 may generate a collaboration timeline 49 which corresponds to a particular collaboration 50. A phonetic processor 53 may generate a phonetic index for a collaboration media stream including audio signals. A phonetic index enables a participant 16 or other entity to subsequently search the collaboration media stream for the occurrence of words or phrases that may have been spoken during the collaboration session.

The collaboration controller 12 also includes an application controller 54, for initiating and/or concurrently initiating applications for a plurality of participant user devices 14 in a collaboration 50, such as participant user devices 14A-14D. In this regard, the application controller 54 may be configured to initiate an application for each participant 16 of a collaboration 50. As a non-limiting example, the application controller 54 may initiate and/or concurrently initiate an application 58 for a participant user device 14 for each participant 16 of a collaboration 50. As used herein, the term "concurrently" is defined as "at least partially overlapping in time." In other words, at least some portions of concurrent transactions for initiating the application on each of the plurality of participant user devices 14A, 14B, 14C, 14D occur, at least in part, during a same period of time.

The application 58 may be provided to a participant 16 for a participant user device 14 in any one of several ways. In one embodiment, a web client 60 executing on the participant user device 14 may present an application 58 from a web server 62. Portions of the content of the application 58 may be generated on the web server 62, as a non-limiting example using Hypertext Markup Language (HTML), and/or Extensible Markup Language (XML). Further portions of the content of the application 58 may be generated on the web client 60, as a non-limiting example using client-executed instructions, such as Javascript, client-side Java, and/or ActiveX as non-limiting examples. One of skill in the art will appreciate that, in accordance with this disclosure, the web server 62 may be a plurality of web servers 62.

In a further embodiment, the application controller 54 may initiate the application 58 by initiating an application instance 64 on a virtualization server 66. The application instance 64 executing on the virtualization server 66 may provide display and control of the application 58 to a collaboration participant 16 by streaming display and control of the application instance 64 to a virtualization client 68 executing on a participant user device 14 of the collaboration participant 16. This embodiment may be referred to as a cloud computing implementation of the application 58.

In this regard, method 100 (FIG. 1) may further comprise requesting initiation of the at least one application 58 for use on the at least one participant user device 14 participating in the collaboration 50. Requesting initiation of the at least one application 58 for use on the at least one participant user device 14 participating in the collaboration may comprise requesting initiation of the at least one application 58 for use on the at least one participant user device 14 participating in the collaboration 50 based on the at least one collaboration license 52 authorizing usage of the at least one application 58 on the at least one participant user device 14 participating in the collaboration 50. Requesting initiation of the at least one application 58 for use on the at least one participant user device 14 participating in the collaboration may comprise requesting initiation of at least one application instance 64 of the at least one application 58 on the at least one participant user device 14 participating in the collaboration 50. Requesting initiation of the at least one application 58 for use on the at least one participant user device 14 participating in the collaboration 50 may also comprise requesting initiation of at least one application instance 64 on at least one virtualization server 66 for at least one participant user device 14 among the plurality of participant user devices 14 participating in the collaboration 50. When provided for execution on at least one virtualization server 66, each application instance 64 may be configured to provide display and control of the application instance 64 to a different participant user device 14 participating in the collaboration 50.

In one embodiment, the application controller 54 may initiate the application 58 by initiating an application client 70 on a participant user device 14 of the collaboration participant 16. The application client 70 may be configured to communicate with an application server 72. The application client 70 and application server 72 communicate to provide display and control of an application 58 to a collaboration participant 16 on the participant user device 14 of the collaboration participant 16. This embodiment may be referred to as a client-server implementation of the application 58. An application client (as a non-limiting example, application client 70) may also be referred to as a client application.

In another embodiment, the application controller 54 may initiate the application 58 for execution directly on participant user device 14. The application 58 may be a standalone application. This embodiment may be referred to as a local application, a native application, or a standalone application.

The application 58 may be configured to communicate to the collaboration controller 12 using an application programming interface (API) 56 of the collaboration controller 12. The application 58 may be configured to communicate with other applications 58 executing for other participants 16 of the collaboration 50 using the application programming interface (API) 56 of the collaboration controller 12.

Storage device 74 may provide remote storage or local storage for one or more application files 76 and/or one or more data files 78 for participant user devices 14 and/or servers 62, 66, 72.

The system 10 may also provide a licensing server 80. Licensing server 80 may license the application 58 for execution. As a non-limiting example, licensing server 80 may license all or portions of web client 60, virtualization client 68, application client 70, web server 62, virtualization server 66, application instance 64, application server 72, and/or other portions of application 58 for execution. In one embodiment, the collaboration controller 12 may determine whether a participant user device 14 in the collaboration 50 is licensed to execute the application 58. In response to determining that the participant user device is not licensed to execute the application 58, the collaboration controller 12 may request a license for the participant user device 14 in the collaboration 50 for the duration of the collaboration 50 from the licensing server 80. In other words, in one embodiment, a license may be requested and provided that is valid only for the duration of the collaboration 50, and installed so as to allow the application 58 to execute for the duration of the collaboration 50. In this regard, licensing server 80 may comprise a collaboration license generator 86 for initially creating a collaboration license 52.

In one embodiment, at least one licensing server 80 may be provided as a part of collaboration controller 12. In this embodiment, the at least one licensing server 80 may be provided as licensing server 82. In another embodiment, at least one licensing server 80 may be provided as a licensing server external to collaboration controller 12. In a further embodiment, a first at least one licensing server 80 is provided as a part of collaboration controller 12 as licensing server 82, while a second at least one licensing server 80 is provided as an external licensing server, as a non-limiting example, separate and distinct from collaboration controller 12. In a further embodiment, the at least one licensing server 80 is only provided integral to collaboration controller 12 as licensing server 82. In that further embodiment, no licensing server 80 external to collaboration controller 12 may be provided.

When collaboration controller 12 comprises a licensing server 80, 82, method 100 (FIG. 1) may further comprise initially creating, on the collaboration controller 12, the at least one collaboration license 52 authorizing usage of the at least one application 58 on the at least one participant user device 14 participating in the collaboration 50.

In one embodiment, collaboration controller 12 may provide at least one license to execute the application 58 for at least one participant user device 14 in the collaboration 50 for the duration of the collaboration 50. In a further embodiment, collaboration controller 12 may first determine whether each participant user device 14 in the collaboration 50 is licensed to execute the application 58. In response to determining that at least one participant user device 14 is not licensed to execute the application 58, collaboration controller 12 may request at least one license for the at least one participant user device 14 in the collaboration 50 for the duration of the collaboration 50. Thereafter, collaboration controller 12 may provide the at least one license to execute the application 58 for the at least one participant user device 14 in the collaboration 50 for the duration of the collaboration 50 to the at least one participant user device 14 in the collaboration 50.

The system 10 may also provide an accounting server 84. The accounting server 84 may be configured to receive at least one accounting record comprising application usage information for collaboration applications. Collaboration controller 12 may create the at least one accounting record comprising application usage information for collaboration applications. Collaboration controller 12 may transmit the at least one accounting record to the accounting server 84. Various usage information about the use of application 58 may be provided in the at least one accounting record.

Collaboration controller 12 may pre-request at least one collaboration license 52 authorizing usage of at least one application 58 on at least one participant user device 14 participating in a collaboration 50. Collaboration controller 12 may pre-request the at least one collaboration license 52 from licensing server 80 and/or 82. Collaboration controller 12 may store the pre-requested at least one collaboration license 52 in a memory, as a non-limiting example memory 44, for later use. As a non-limiting example, collaboration controller 12 may pre-request the at least one collaboration license 52 authorizing usage of the at least one application 58 on at least one participant user device 14 participating in the collaboration 50 before the at least one participant user device 14 joins the collaboration 50. In this example, collaboration controller 12 may provide the stored at least one collaboration license 52 to the at least one participant user device 14 after the at least one participant user device 14 joins the collaboration 50.

Figure 3:
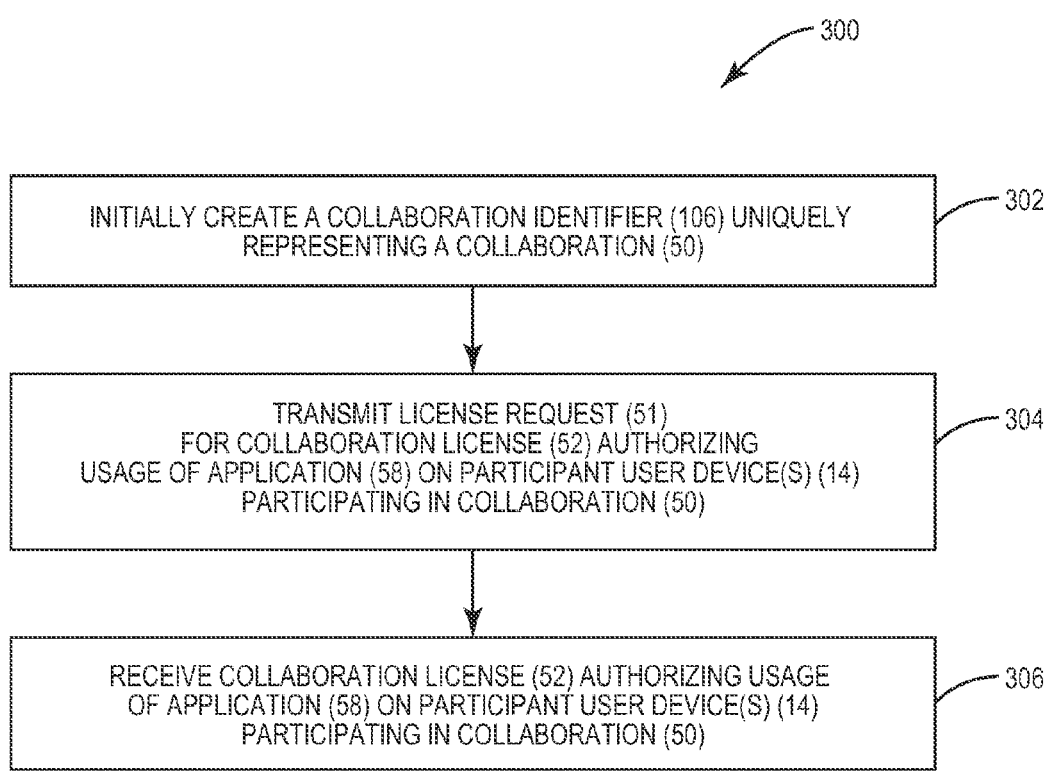
FIG. 3 is an exemplary flowchart illustrating an exemplary method according to FIG. 1 for licensing an application.

In this regard, FIG. 3 depicts a flowchart illustrating an exemplary method 300 of a collaboration controller 12 for licensing at least one application 58. Method 300 comprises initially creating a collaboration identifier 106 (block 302). The collaboration identifier 106 uniquely represents a collaboration 50. The collaboration 50 may include a plurality of participant user devices 14. The collaboration 50 may include at least one collaborative communication session among the plurality of participant user devices 14.

Method 300 further comprises transmitting a license request 51 for at least one collaboration license 52 authorizing usage of at least one application 58 on at least one participant user device 14 participating in a collaboration 50 (block 304). The license request 51 may comprise the collaboration identifier 106. The license request 51 may also comprise at least one application identifier representing at least one application 58. The collaboration 50 may comprise at least one collaborative communication session among a plurality of participant user devices 14. The license request 51 may be transmitted before the at least one participant user device 14 joins the collaboration 50. The license request 51 may be transmitted to a licensing server 80, 82.

Method 300 further comprises receiving the at least one collaboration license 52 authorizing usage of the at least one application 58 on the at least one participant user device 14 participating in the collaboration 50 (block 306). The license request 51 may be received from the licensing server 80, 82.

Collaboration controller 12 may just-in-time request at least one collaboration license 52 authorizing usage of at least one application 58 on at least one participant user device 14 participating in a collaboration 50. As a non-limiting example, collaboration controller 12 may request at least one collaboration license 52 authorizing usage of at least one application 58 on at least one participant user device 14 participating in a collaboration 50 after the at least one participant user device 14 joins the collaboration.

Figure 4:
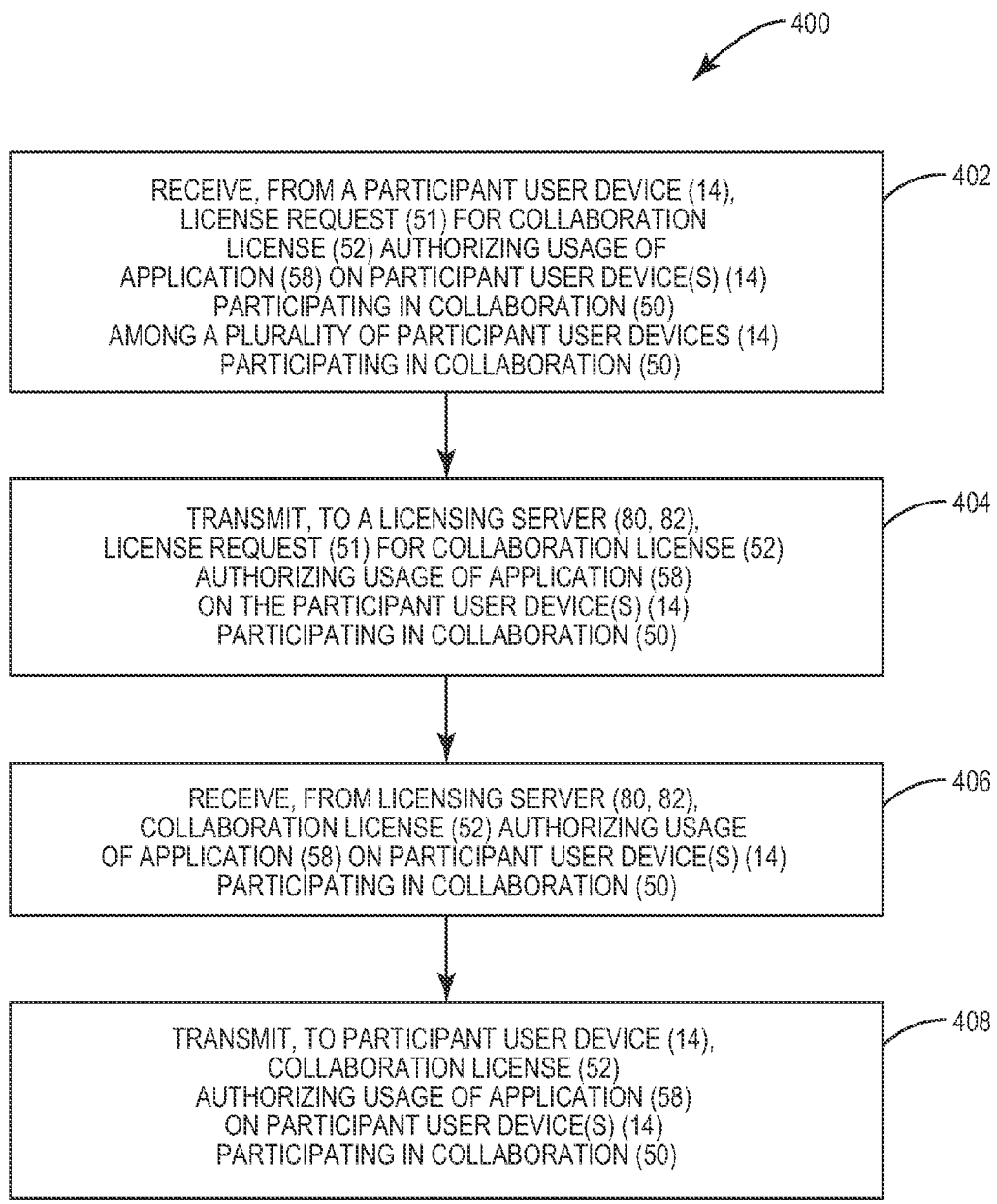
FIG. 4 is an exemplary flowchart illustrating an exemplary method according to FIG. 1 for licensing an application.

In this regard, FIG. 4 depicts a flowchart illustrating an exemplary method 400 of a collaboration controller 12 for licensing at least one application 58. Method 400 comprises receiving a license request 51 for at least one collaboration license 52 authorizing usage of at least one application 58 on the at least one participant user device 14 among a plurality of participant user devices 14 participating in a collaboration 50 (block 402). The collaboration 50 may comprise at least one collaborative communication session among the plurality of participant user devices 14. The license request 51 may be received from at least one participant user device 14 participating in the collaboration 50.

Method 400 further comprises transmitting a license request 51 for at least one collaboration license 52 authorizing usage of at least one application 58 on at least one participant user device 14 participating in a collaboration 50 (block 404). The collaboration 50 may comprise at least one collaborative communication session among the plurality of participant user devices 14. The license request 51 may be transmitted to a licensing server 80, 82.

Method 400 further comprises receiving the at least one collaboration license 52 authorizing usage of the at least one application 58 on the at least one participant user device 14 participating in the collaboration 50 (block 406). The license request 51 may be received from the licensing server 80, 82.

Method 400 further comprises transmitting the at least one collaboration license 52 authorizing usage of the at least one application 58 on the at least one participant user device 14 participating in the collaboration 50 (block 408). The at least one collaboration license 52 may be transmitted to the at least one participant user device 14.

In one embodiment, collaboration controller 12 transmits the license request 51 for at least one collaboration license 52 (block 404) in response to receiving the license request of block 402. In an alternative embodiment, collaboration controller 12 transmits the license request 51 for at least one collaboration license 52 (block 404) in response to receiving a collaboration join request for a participant user device 14 to join the collaboration 50. As non-limiting examples, blocks 902, 904, 906 (FIG. 9A) and/or 1102, 1104, 1106 (FIG. 11A) depict such exemplary collaboration join requests for at least one participant user device 14 to join the collaboration 50. In this alterative embodiment, block 408 may be performed in response to block 402. Transmitting the license request 51 for at least one collaboration license 52 (block 404) in response to receiving a collaboration join request may reduce the perceived latency associated with receiving a collaboration license 52 that at least one participant 16 associated with at least one participant user device 14 may experience.

Figure 5A:
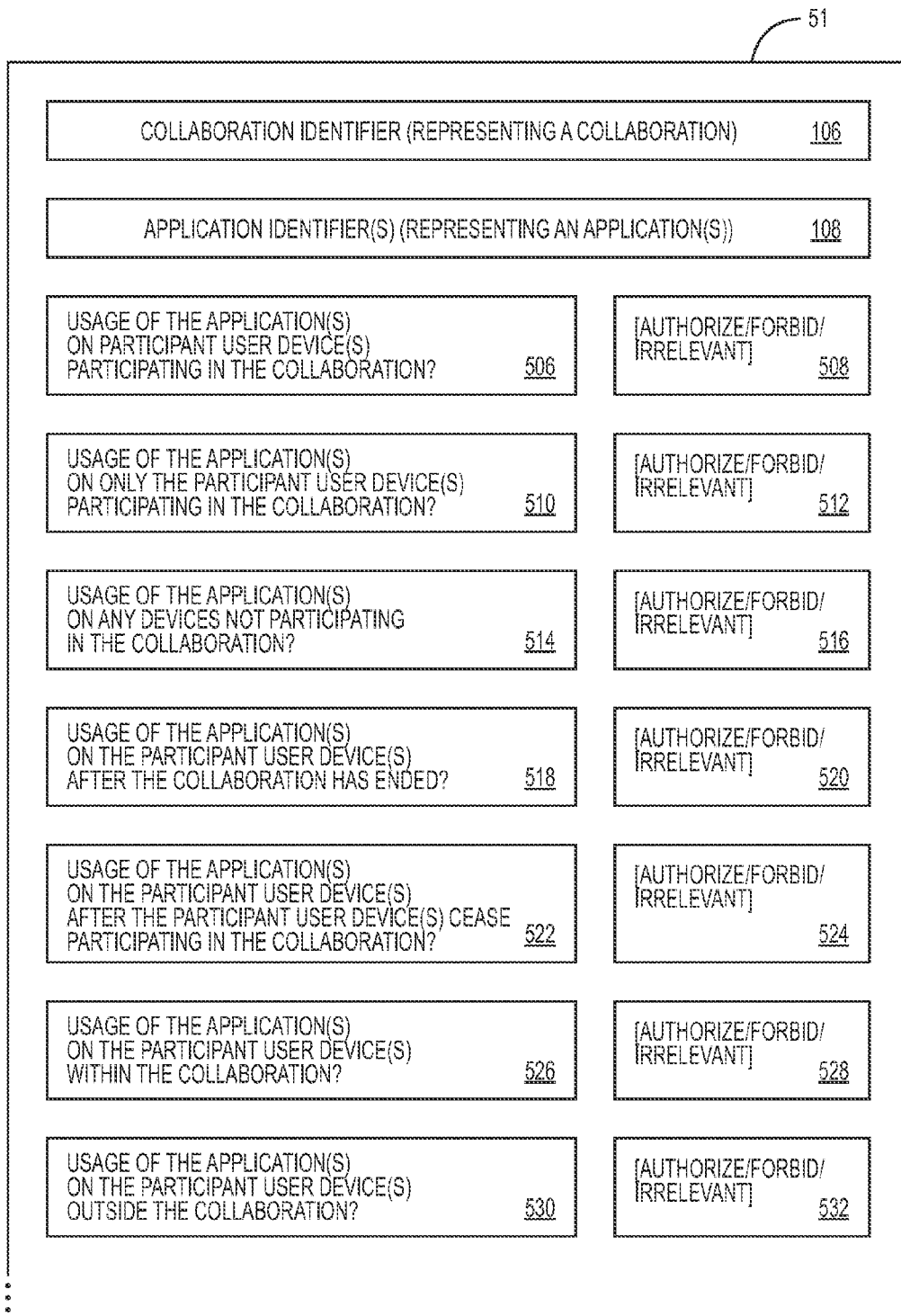

Exemplary license requests for requesting a collaboration license 52 are now discussed in further detail. In this regard, FIGS. 5A and 5B depict an exemplary license request 51 (as a non-limiting example, a license request message) for requesting a collaboration license 52. The license request 51 comprises a collaboration identifier 106. The collaboration identifier 106 uniquely represents a collaboration 50 for which at least one collaboration license 52 is being requested. The collaboration identifier 106 may uniquely represent a collaboration 50 using any of a variety of syntaxes. In one embodiment, the collaboration identifier 106 is a Universal Resource Locator (URL). As a non-limiting example, the URL may comprise a domain name or IP address of a collaboration controller 12 and a unique character sequence (as a non-limiting example, a unique number) uniquely identifying the collaboration 50. In this regard, in one non-limiting example, the collaboration identifier 106 may have a syntax such as "http://collaboration-controller.com?collaboration=2", where collaborationcontroller.com uniquely identifies a collaboration service and 2 (or another numerical sequence or character sequence) uniquely identifies a collaboration 50 hosted by the collaboration service. In another non-limiting example, the collaboration identifier 106 may have a syntax such as "http://collaboration1.collaborationcontroller.com", where "collaborationcontroller.com" uniquely identifies a collaboration service and "collaboration1" uniquely identifies a collaboration 50 hosted by that collaboration service. Any other syntax that uniquely identifies a collaboration 50 may also be used for the collaboration identifier 106. As a further non-limiting example, the collaboration identifier 106 may comprise a conference bridge phone number and pin number for a specific conference hosted on one or more conference bridge servers. In this regard, in one non-limiting example, the collaboration identifier may have a syntax such as "19195551111#3001", where "1919555111" uniquely identifies a phone number for a collaboration service and where "#3001" uniquely identifies a pin number for a collaboration 50 hosted by the collaboration service.

The license request 51 also comprises at least one application identifier 108. The at least one application identifier 108 represents at least one application 58 for which a collaboration license 52 is requested. In one embodiment, the application identifier 108 is a Universal Resource Locator (URL). As a non-limiting example, the URL may comprise a domain name or IP address of an application provider and a unique character sequence uniquely identifying the application 58. In this regard, in one non-limiting example, the application identifier 108 may have a syntax such as "http://applicationprovider.com?application=wordProcessor", where "applicationprovider.com" uniquely identifies an application provider and "application=wordProcessor" uniquely identifies an application 58 provided by the application provider. The application identifier 108 may also comprise an application version number. In this regard, in another non-limiting example, the application identifier 108 may have a syntax such as "http://applicationprovider.com?application=wordProcessor?version=7.2", where version "7.2" identifies a particular version of the application 58.

The license request 51 may request a collaboration license 52 authorizing usage of the at least one application 58 on at least one participant user device 14 participating in the collaboration 50 (506, 508 (AUTHORIZE)). The license request 51 may request a collaboration license 52 forbidding (i.e. not authorizing) usage of the at least one application 58 on at least one participant user device 14 participating in the collaboration 50 (506, 508 (FORBID)). The license request 51 may request a collaboration license 52 that is not based on usage of the at least one application 58 on at least one participant user device 14 participating in the collaboration 50 (506, 508 (IRRELEVANT)).

The license request 51 may request a collaboration license 52 authorizing usage of the at least one application 58 on only at least one participant user device 14 participating in the collaboration 50 (510, 512 (AUTHORIZE). The license request 51 may request a collaboration license 52 forbidding (i.e. not authorizing) usage of the at least one application 58 on only at least one participant user device 14 participating in the collaboration 50 (510, 512 (FORBID)). The license request 51 may request a collaboration license 52 that is not based on usage of the at least one application 58 on at least one participant user device 14 participating in the collaboration 50 (510, 512 (IRRELEVANT)).

The license request 51 may request a collaboration license 52 forbidding (i.e. not authorizing) usage of the at least one application 58 on any devices not participating in the collaboration 50 (514, 516 (FORBID)). The license request 51 may request a collaboration license 52 authorizing usage of the at least one application 58 on devices not participating in the collaboration 50 (514, 516 (AUTHORIZE)). The license request 51 may request a collaboration license 52 not based on usage of the at least one application 58 on any devices not participating in the collaboration 50 (514, 516 (IRRELEVANT)).

The license request 51 may request a collaboration license 52 forbidding (i.e. not authorizing) usage of the at least one application 58 on at least one participant user device 14 after the collaboration 50 has ended (518, 520 (FORBID)). The license request 51 may request a collaboration license 52 authorizing usage of the at least one application 58 on at least one participant user device 14 after the collaboration 50 has ended (518, 520 (AUTHORIZE)). The license request 51 may request a collaboration license 52 not based on usage of the at least one application 58 on at least one participant user device 14 after the collaboration 50 has ended (518, 520 (IRRELEVANT)).

The license request 51 may request a collaboration license 52 forbidding (i.e. not authorizing) usage of the at least one application 58 on at least one participant user device 14 after the at least one participant user device 14 ceases participating in the collaboration 50 (522, 524 (FORBID)). The license request 51 may request a collaboration license 52 authorizing usage of the at least one application 58 on at least one participant user device 14 after the at least one participant user device 14 ceases participating in the collaboration 50 (522, 524 (AUTHORIZE)). The license request 51 may request a collaboration license 52 not based on usage of the at least one application 58 on at least one participant user device 14 after the at least one participant user device 14 ceases participating in the collaboration 50 (522, 524 (IRRELEVANT)).

The license request 51 may request a collaboration license 52 authorizing usage of the at least one application 58 on the at least one participant user device 14 within the collaboration 50 (526, 528 (AUTHORIZE)). The license request 51 may request a collaboration license 52 forbidding (i.e. not authorizing) usage of the at least one application 58 on the at least one participant user device 14 within the collaboration 50 (526, 528 (FORBID)). The license request 51 may request a collaboration license 52 that is not based on usage of the at least one application 58 on the at least one participant user device 14 within the collaboration 50 (526, 528 (IRRELEVANT)).

The license request 51 may request a collaboration license 52 forbidding (i.e. not authorizing) usage of the at least one application 58 on the at least one participant user device 14 outside the collaboration 50 (530, 532 (FORBID)). The license request 51 may request a collaboration license 52 authorizing usage of the at least one application 58 on the at least one participant user device 14 outside the collaboration 50 (530, 532 (AUTHORIZE)). The license request 51 may request a collaboration license 52 that is not based on usage of the at least one application 58 on the at least one participant user device 14 outside the collaboration 50 (530, 532 (IRRELEVANT)).

The license request 51 may request a collaboration license 52 authorizing usage of the at least one application 58 on the at least one participant user device 14 for the duration of the collaboration 50 (534, 536 (AUTHORIZE)). The license request 51 may request a collaboration license 52 forbidding (i.e. not authorizing) usage of the at least one application 58 on the at least one participant user device 14 for the duration of the collaboration 50 (534, 536 (FORBID)). The license request 51 may request a collaboration license 52 that is not based on usage of the at least one application 58 on the at least one participant user device 14 for the duration of the collaboration 50 (534, 536 (IRRELEVANT)).

The license request 51 may request a collaboration license 52 authorizing usage of the at least one application 58 on the at least one participant user device 14 for only the duration of the collaboration 50 (538, 540 (AUTHORIZE)). The license request 51 may request a collaboration license 52 forbidding (i.e. not authorizing) usage of the at least one application 58 on the at least one participant user device 14 for only the duration of the collaboration 50 (538, 540 (FORBID)). The license request 51 may request a collaboration license 52 that is not based on usage of the at least one application 58 on the at least one participant user device 14 for the duration of the collaboration 50 (538, 540 (IRRELEVANT)).

The license request 51 may request a collaboration license 52 authorizing usage of the at least one application 58 on the at least one participant user device 14 when started during the collaboration 50 after the collaboration 50 has ended until execution of the at least one application 58 is terminated (542, 544 (AUTHORIZE)). The license request 51 may request a collaboration license 52 forbidding (i.e. not authorizing) usage of the at least one application 58 on the at least one participant user device 14 when started during the collaboration 50 after the collaboration 50 has ended until execution of the at least one application 58 is terminated (542, 544 (FORBID)). The license request 51 may request a collaboration license 52 that is not based on usage of the at least one application 58 on the at least one participant user device 14 when started during the collaboration 50 after the collaboration 50 has ended until execution of the at least one application 58 is terminated (542, 544 (IRRELEVANT)).

The license request 51 may request a collaboration license 52 authorizing usage of the at least one application 58 on at least one participant user device 14 which is not moderating the collaboration 50 (546, 548 (AUTHORIZE)). In this regard, as a non-limiting example, the at least one participant user device 14 authorized to use the at least one application 58 may be used by at least one participant 16 who is not a moderator for the collaboration 50 and not used by any participant 16 who is a moderator for the collaboration 50. The license request 51 may request a collaboration license 52 forbidding (i.e. not authorizing) usage of the at least one application 58 on at least one participant user device 14 which is not moderating the collaboration 50 (546, 548 (FORBID)). In this regard, as a non-limiting example, at least one participant user device 14 which is not used by a moderator for the collaboration 50 would not be authorized to use the at least one application 58 by the requested collaboration license 52. The license request 51 may request a collaboration license 52 that is not based on usage of the at least one application 58 on whether the at least one participant user device 14 is or is not moderating the collaboration 50 (546, 548 (IRRELEVANT)).

The license request 51 may request a collaboration license 52 authorizing a certain maximum number of license instances (550, 552). The license request 51 may request a collaboration license 52 authorizing a certain maximum number of license instances per collaboration 50 (554, 556). The license request 51 may request a collaboration license 52 authorizing a certain maximum number of license instances that may be borrowed by the at least one participant user device 14 (558, 560). The license request 51 may request a collaboration license 52 which will be valid until a certain expiration date (562, 564). The license request 51 may request a collaboration license 52 which will be valid until at least a certain expiration date. The license request 51 may request a collaboration license 52 which will be valid for at least a certain duration of time.

License request 51 may be transmitted from a collaboration controller 12 to a licensing server 80, 82. License request 51 may also be transmitted from a participant user device 14 to a licensing server 80, 82.

Figure 6A:
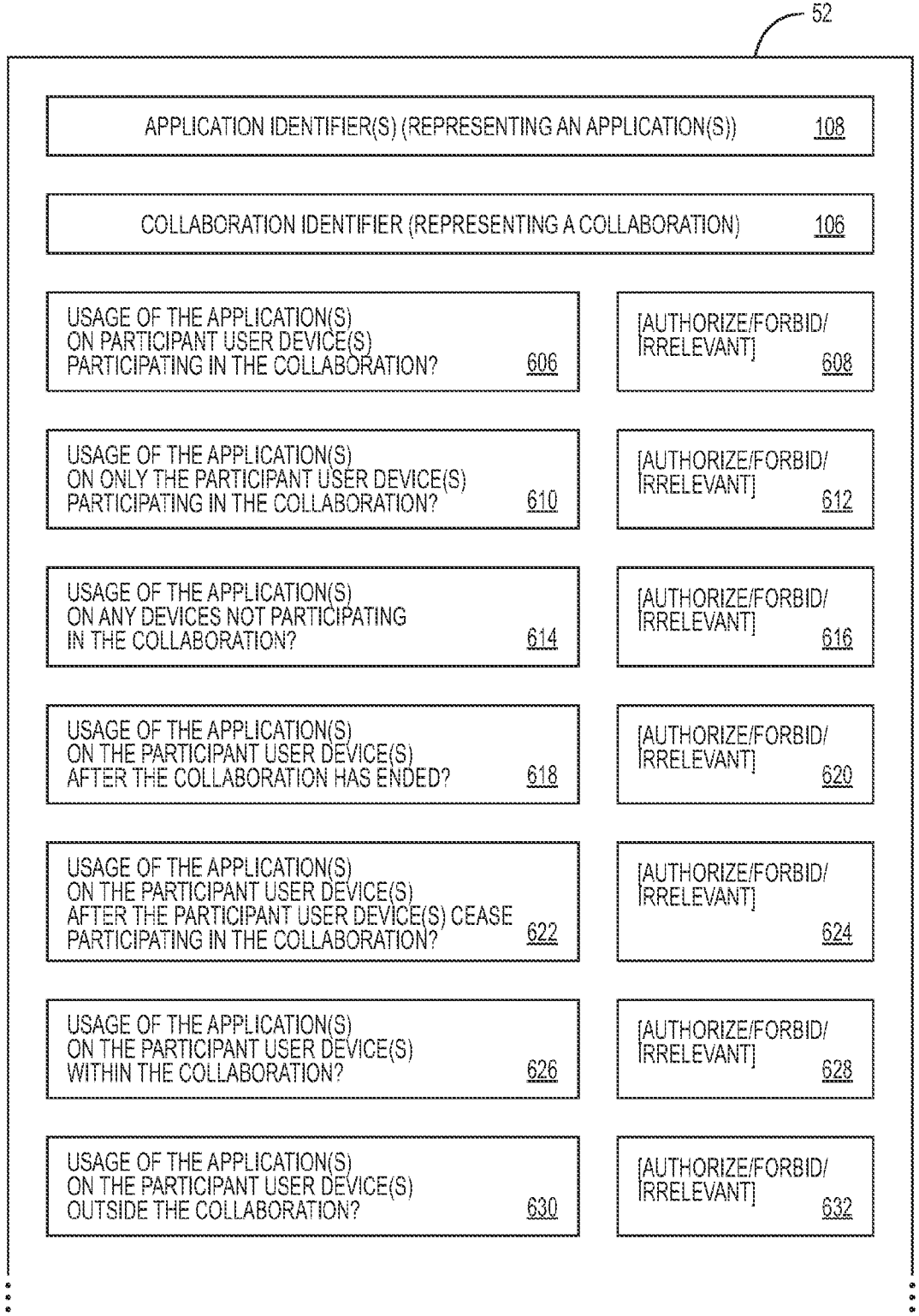

In response to receiving a license request 51, a collaboration license 52 may be transmitted. In this regard, FIGS. 6A and 6B depict an exemplary collaboration license 52. Collaboration license 52 comprises a collaboration identifier 106. The collaboration identifier 106 uniquely represents a collaboration 50 for which at least one collaboration license 52 is being requested. The collaboration identifier 106 may uniquely represent a collaboration 50 using any of a variety of syntaxes, as previously discussed. The collaboration license 52 also comprises at least one application identifier 108. The at least one application identifier 108 represents at least one application 58 for which a collaboration license 52 is requested. The at least one application identifier 108 may represent the at least one application 58 using any of a variety of syntaxes, as previously discussed.

Collaboration license 52 may authorize usage of the at least one application 58 on at least one participant user device 14 participating in the collaboration 50 (606, 608 (AUTHORIZE)). Collaboration license 52 may forbid (i.e. not authorize) usage of the at least one application 58 on at least one participant user device 14 participating in the collaboration 50 (606, 608 (FORBID)). Collaboration license 52 may not be based on usage of the at least one application 58 on at least one participant user device 14 participating in the collaboration 50 (606, 608 (IRRELEVANT)).

Collaboration license 52 may authorize usage of the at least one application 58 on only at least one participant user device 14 participating in the collaboration 50 (610, 612 (AUTHORIZE)). Collaboration license 52 may forbid (i.e. not authorize) usage of the at least one application 58 on only at least one participant user device 14 participating in the collaboration 50 (610, 612 (FORBID)). Collaboration license 52 may not be based on usage of the at least one application 58 on at least one participant user device 14 participating in the collaboration 50 (610, 612 (IRRELEVANT)).

Collaboration license 52 may forbid (i.e. not authorize) usage of the at least one application 58 on any devices not participating in the collaboration 50 (614, 616 (FORBID)). Collaboration license 52 may authorize usage of the at least one application 58 on devices not participating in the collaboration 50 (614, 616 (AUTHORIZE)). Collaboration license 52 may not be based on usage of the at least one application 58 on any devices not participating in the collaboration 50 (614, 616 (IRRELEVANT)).

Collaboration license 52 may forbid (i.e. not authorize) usage of the at least one application 58 on at least one participant user device 14 after the collaboration 50 has ended (618, 620 (FORBID)). Collaboration license 52 may authorize usage of the at least one application 58 on at least one participant user device 14 after the collaboration 50 has ended (618, 620 (AUTHORIZE)). Collaboration license 52 may not be based on usage of the at least one application 58 on at least one participant user device 14 after the collaboration 50 has ended (618, 620 (IRRELEVANT)).

Collaboration license 52 may forbid (i.e. not authorize) usage of the at least one application 58 on at least one participant user device 14 after the at least one participant user device 14 ceases participating in the collaboration 50 (622, 624 (FORBID)). Collaboration license 52 may authorize usage of the at least one application 58 on at least one participant user device 14 after the at least one participant user device 14 ceases participating in the collaboration 50 (622, 624 (AUTHORIZE)). Collaboration license 52 may not be based on usage of the at least one application 58 on at least one participant user device 14 after the at least one participant user device 14 ceases participating in the collaboration 50 (622, 624 (IRRELEVANT)).

Collaboration license 52 may authorize usage of the at least one application 58 on the at least one participant user device 14 within the collaboration 50 (626, 628 (AUTHORIZE)). Collaboration license 52 may forbid (i.e. not authorize) usage of the at least one application 58 on the at least one participant user device 14 within the collaboration 50 (626, 628 (FORBID)). Collaboration license 52 may not be based on usage of the at least one application 58 on the at least one participant user device 14 within the collaboration 50 (626, 628 (IRRELEVANT)).

Collaboration license 52 may forbid (i.e. not authorize) usage of the at least one application 58 on the at least one participant user device 14 outside the collaboration 50 (630, 632 (FORBID)). Collaboration license 52 may authorize usage of the at least one application 58 on the at least one participant user device 14 outside the collaboration 50 (630, 632 (AUTHORIZE)). Collaboration license 52 may not be based on usage of the at least one application 58 on the at least one participant user device 14 outside the collaboration 50 (630, 632 (IRRELEVANT)).

Collaboration license 52 may authorize usage of the at least one application 58 on the at least one participant user device 14 for the duration of the collaboration 50 (634, 636 (AUTHORIZE)). Collaboration license 52 may forbid (i.e. not authorize) usage of the at least one application 58 on the at least one participant user device 14 for the duration of the collaboration 50 (634, 636 (FORBID)). Collaboration license 52 may not be based on usage of the at least one application 58 on the at least one participant user device 14 for the duration of the collaboration 50 (634, 636 (IRRELEVANT)).

Collaboration license 52 may authorize usage of the at least one application 58 on the at least one participant user device 14 for only the duration of the collaboration 50 (638, 640 (AUTHORIZE)). Collaboration license 52 may forbid (i.e. not authorize) usage of the at least one application 58 on the at least one participant user device 14 for only the duration of the collaboration 50 (638, 640 (FORBID)). Collaboration license 52 may not be based on usage of the at least one application 58 on the at least one participant user device 14 for the duration of the collaboration 50 (638, 640 (IRRELEVANT)).

Collaboration license 52 may authorize usage of the at least one application 58 on the at least one participant user device 14 when started during the collaboration 50 after the collaboration 50 has ended until execution of the at least one application 58 is terminated (642, 644 (AUTHORIZE)). Collaboration license 52 may forbid (i.e. not authorize) usage of the at least one application 58 on the at least one participant user device 14 when started during the collaboration 50 after the collaboration 50 has ended until execution of the at least one application 58 is terminated (642, 644 (FORBID)). Collaboration license 52 may not be based on usage of the at least one application 58 on the at least one participant user device 14 when started during the collaboration 50 after the collaboration 50 has ended until execution of the at least one application 58 is terminated (642, 644 (IRRELEVANT)).

Collaboration license 52 may authorize usage of the at least one application 58 on at least one participant user device 14 which is not moderating the collaboration 50 (646, 648 (AUTHORIZE)). In this regard, as a non-limiting example, the at least one participant user device 14 which is not a moderator for the collaboration 50 would be authorized to use the at least one application 58. Collaboration license 52 may forbid (i.e. not authorize) usage of the at least one application 58 on at least one participant user device 14 which is not moderating the collaboration 50 (646, 648 (FORBID)). In this regard, as a non-limiting example, any at least one participant user device 14 which is not used by a moderator for the collaboration 50 would not be authorized by the collaboration license 52 to use the at least one application 58. Collaboration license 52 may not be based on usage of the at least one application 58 on whether the at least one participant user device 14 is or is not moderating the collaboration 50 (646, 648 (IRRELEVANT)).

Collaboration license 52 may authorize a certain maximum number of license instances (650, 652). Collaboration license 52 may authorize a certain maximum number of license instances per collaboration 50 (654, 656). Collaboration license 52 may authorize a certain maximum number of license instances that may be borrowed by the at least one participant user device 14 (658, 660). Collaboration license 52 may comprise a certain expiration date after which the collaboration license 52 will be expired and no longer valid (662, 664 (DD-MM-YYYY)). Collaboration license 52 may comprise an indication that the collaboration license 52 is a perpetual license (662, 664 (NONE)) which does not expire.

One of skill in the art will appreciate that collaboration license 52 may also comprise further authorization rules, policies, and/or other fields in accordance with this disclosure.

Collaboration controller 12 may enforce [as a non-limiting example, authorize and/or forbid (i.e. not authorize)], based on the collaboration license 52, any of the herein discussed rules, policies, and/or other fields of the collaboration license 52.

In this regard, several non-limiting examples are now discussed. Collaboration controller 12 may authorize or forbid (i.e. not authorize) usage of the at least one application on any devices not participating in the collaboration based on the at least one collaboration license. Collaboration controller 12 may authorize or forbid (i.e. not authorize) usage of the at least one application on the at least one participant user device after the collaboration has ended based on the at least one collaboration license. Collaboration controller 12 may authorize or forbid (i.e. not authorize) usage of the at least one application on the at least one participant user device after the at least one participant user device ceases participating in the collaboration based on the at least one collaboration license.

Collaboration controller may authorize or forbid (i.e. not authorize) usage of the at least one application on the at least one participant user device within the collaboration based on the at least one collaboration license. Collaboration controller 12 may authorize or forbid (i.e. not authorize) usage of the at least one application on the at least one participant user device outside the collaboration based on the at least one collaboration license.

Collaboration controller 12 may authorize or forbid (i.e. not authorize) usage of the at least one application on the at least one participant user device for a duration of the collaboration based on the at least one collaboration license. Collaboration controller 12 may authorize or forbid (i.e. not authorize) usage of the at least one application on the at least one participant user device for only the duration of the collaboration based on the at least one collaboration license. Collaboration controller 12 may authorize or forbid (i.e. not authorize) usage of the at least one application when started during the collaboration after the collaboration has ended until execution of the at least one application is terminated based on the at least one collaboration license.

Participant user device 14 may also enforce [as a non-limiting example, authorize or forbid (i.e. not authorize)] any of the herein discussed policies of collaboration license 52. In one embodiment, collaboration controller 12 may be provided as a part of a participant user device 14.

Collaboration license 52 may comprise an authorizing digital signature 666. The authorizing digital signature 666 may or may not be signed by a developer, a manufacturer, and/or a distributor of the at least one application 58. The authorizing digital signature 666 may or may not be signed by an entity controlling the collaboration controller 12. The entity controlling the collaboration controller 12 may provide the collaboration controller 12 as a service. The entity controlling the collaboration controller 12 may or may not be a developer, manufacturer, and/or a distributor of the at least one application 58. The authorizing digital signature 666 may or may not be signed by a certificate authority. The certificate authority may be a trusted party distinct from the entity controlling the collaboration controller 12. The authorizing digital signature 666 may be cryptographically signed, using any of a variety of cryptographic signature algorithms, including as non-limiting examples, a public key signature, a private key signature, and/or a one-time hash signature. One of skill in the art will appreciate other cryptographic signature algorithms that may be used in accordance with this disclosure.

Collaboration license 52 may be transmitted from a licensing server 80, 82 to a collaboration controller 12. Collaboration license 52 may be transmitted from a collaboration controller 12 to a participant user device 14. Collaboration license 52 may be transmitted from a licensing server 80, 82 to a participant user device 14.

FIGS. 7A and 7B depict an exemplary collaboration license 700 in accordance with FIGS. 6A and 6B. Exemplary collaboration license 700 is depicted using an exemplary XML syntax. One of skill in the art will appreciate other syntaxes that may be used in accordance with this disclosure.

Figure 8:
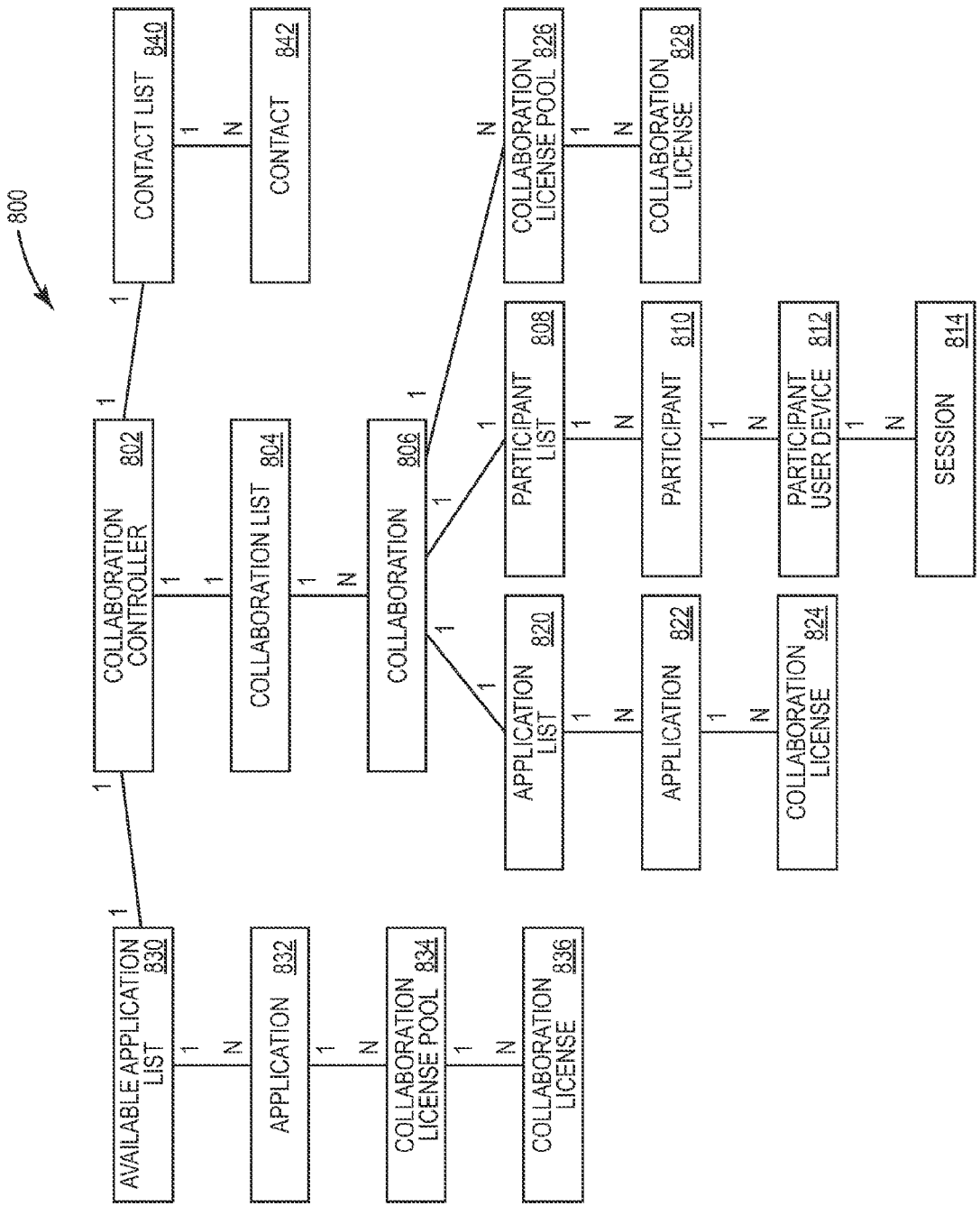
FIG. 8 illustrates an exemplary embodiment of a data structure with which embodiments disclosed herein may be practiced.

FIG. 8 depicts an exemplary data structure 800 for storage and retrieval of data for a collaboration 50. The data structure 800 may be provided for a collaboration controller 12, a participant user device 14, and/or a licensing server 80, 82. Data structure 800 comprises a collaboration controller record 802 which may comprise information about the collaboration controller 12, including a network address (as a non-limiting example, an Internet Protocol (IP) address) of the collaboration controller 12. A collaboration list 804 may be associated with the collaboration controller record 802. The collaboration list 804 may provide a plurality of collaboration records 806, each collaboration record 806 providing information about a different collaboration 50 managed by the collaboration controller 12 associated with the collaboration controller record 802.

A participant list 808 may be associated with each collaboration record 806. The participant list 808 may provide a list of participant records 810, each participant record 810 representing a participant 16 in the collaboration 50 represented by collaboration record 806. At least one participant user device record 812 may be associated with each participant record 810. The at least one participant user device records 812 provide information about at least one participant user devices 14 that a participant 16 represented by a participant record 810 is using for the collaboration 50 represented by collaboration record 806. Each participant user device 14 may have at least one session (represented by at least one session record 814) for communicating with the collaboration 50 (represented by collaboration record 806).

An application list 820 may also be associated with each collaboration record 806. The application list 820 may provide a list of applications records 822 for each application 58 which may be assigned to the collaboration 50 (represented by collaboration record 806). At least one collaboration license 52 (represented by collaboration license record 824) may be associated with each at least one application 58 (represented by application record 822).

A pool of collaboration licenses 52 may be associated with the collaboration 50. In this regard, at least one collaboration license pool record 826 may be associated with the collaboration record 806. Each at least one collaboration license pool (represented by a collaboration license pool record 826) may be associated with at least one collaboration license 52 (represented by a collaboration license record 828). A collaboration license pool record 826 may represent collaboration licenses 52 in active use for the collaboration 50 associated with the collaboration record 806. A collaboration license pool record 826 may represent collaboration licenses 52 available for use for the collaboration 50 associated with the collaboration record 806. A collaboration license pool record 826 may represent at least one collaboration license 52 that has been borrowed by a participant user device 14 participating in the collaboration 50 associated with collaboration record 806. A collaboration license pool record 826 may represent at least one collaboration license 52 that is available for borrowing by a participant user device 14 participating in the collaboration 50 associated with collaboration record 806. As herein discussed in greater detail, each collaboration license 52 (represented by collaboration license record 828) may authorize usage of at least one application 58 on at least one participant user device 14 participating in the collaboration 50 (represented by the collaboration record 806). Any of the herein discussed collaboration license pools may be provided alone or in combination. One of skill in the art will appreciate other collaboration license pools and collaboration license pool records 826 that may be associated with collaboration record 806 in accordance with this disclosure.

The data structure 800 may optionally provide an available application list 830, and at least one application record 832 indicating at least one application 58 which may be assigned to a collaboration 50 of the collaboration controller 12 associated with the collaboration controller record 802. The available application list 830 may alternatively be associated with each collaboration record 806. At least one collaboration pool record 834 may be associated with each application record 832, each at least one collaboration pool record 834 representing at least one collaboration pool associated with the application 58 represented by application record 832. Each at least one collaboration pool record 834 may be associated with at least one collaboration license record 836, the at least one collaboration license record 836 representing at least one collaboration license 52 associated with the collaboration license pool record 834. A collaboration license pool record 834 may represent collaboration licenses 52 available for use for the application 58 associated with application record 832. A collaboration license pool record 834 may represent collaboration licenses 52 in active use for the application 58 associated with the application record 832. A collaboration license pool record 834 may represent at least one collaboration license 52 that is available for borrowing by a participant user device 14 which desires to borrow a license for executing at least one application 58 associated with application record 832. A collaboration license pool record 834 may represent at least one collaboration license 52 that has been borrowed by a participant user device 14 for executing at least one application 58 associated with application record 832. As herein discussed in greater detail, each collaboration license 52 (represented by collaboration license record 836) may authorize usage of at least one application 58 (represented by application record 832) on at least one participant user device 14 participating in at least one collaboration 50.

The data structure 800 may also optionally provide a contact list record 840 associated with the collaboration controller record 802 indicating at least one contact (each contact associated with a contact record 842) that may assigned to a collaboration 50 (represented by a collaboration record 806) of the collaboration controller 12 (represented by the collaboration controller record 802). A contact list record 840 may also be associated directly with a participant record 810, enabling the participant 16 to have a participant specific list of contacts that may be assigned to a collaboration 50 (represented by a collaboration record 806). In other embodiments, the contact list record 840 may additionally or instead be associated with a participant user device record 812, providing a participant user device 14 specific contact list 840.

Figure 9A:
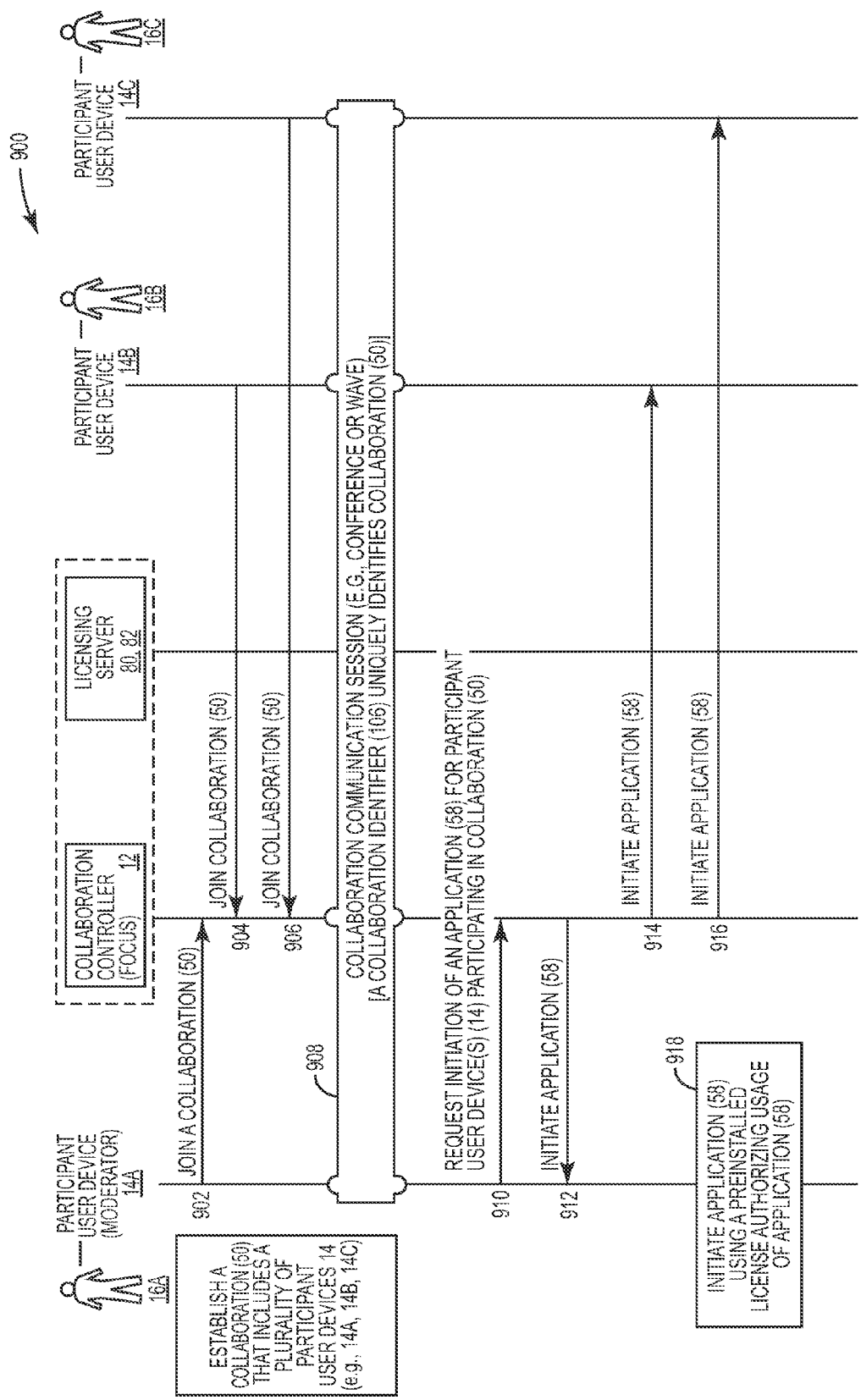
FIG. 9A depicts an exemplary message flow diagram illustrating an exemplary method for establishing a collaboration and for requesting initiation of at least one application for the collaboration participants.

FIG. 9A depicts an exemplary message flow diagram illustrating an exemplary method 900 for establishing a collaboration 50 and for requesting initiation of at least one application 58 for usage on at least one participant user device 14. Method 900 comprises establishing a collaboration 50 that includes a plurality of participant user devices 14. In this regard, participant user devices 14A, 14B, and 14C join the collaboration 50 (blocks 902, 904, 906). In one embodiment, at least one participant user device 14 may join the collaboration 50 by transmitting at least one collaboration join request 902, 904, 906 to join the collaboration 50 (as depicted in FIG. 9A). The at least one collaboration join request 902, 904, 906 may be transmitted to the collaboration controller 12.

In another embodiment, at least one participant user device 14 may join the collaboration 50 by being joined to the collaboration 50. In this regard, the at least one participant user device 14 may receive an invitation message (not shown) to join the collaboration 50. The collaboration invitation request received by the at least one participant user device 14 to join the collaboration 50 may be sent by a participant user device 14 and/or the collaboration controller 12 which is the focus of the collaboration 50. In that case, the at least one participant user device 14 may transmit a message (not shown) to the collaboration controller 12 to accept the invitation to join the collaboration 50. One of skill in the art will appreciate other embodiments in accordance with this disclosure for joining at least one participant user device 14 to the collaboration 50.

Participant user devices 14 (as non-limiting examples, 14A, 14B, and 14C) may be controlled by at least one participant 16 (as non-limiting examples, 16A, 16B, and 16C) of the collaboration 50. A participant user device 14 may or may not be a moderator for the collaboration 50. As depicted in FIG. 9A, participant user device 14A may be a moderator for collaboration 50. Participant user devices 14 (as non-limiting examples, 14B and 14C) may be non-moderators for the collaboration 50. A moderator may have additional control for policing a collaboration 50 than non-moderators. In one embodiment, a moderating participant user device (as a non-limiting example, participant user device 14A) may remove other participant user devices (as non-limiting examples, 14B and/or 14C) from the collaboration 50.

A collaboration communication session is established (block 908). In one embodiment the collaboration 50 may be a conference. As non-limiting examples, the conference may be an audio conference, a video conference, and/or a text chat conference. In another embodiment the collaboration 50 may be a wave. At least one collaboration controller 12 may be a focus for one or more collaborations 50. A collaboration identifier 106 uniquely identifies each collaboration 50.

Collaboration 50 may be an active collaboration. An active collaboration may be a collaboration which has already been joined by at least one participant user device 14. An active collaboration may also be a collaboration which has already been joined by at least two participant user devices 14. An active collaboration may also be a collaboration which has already been joined by at least three participant user devices 14.

In one embodiment, in which the collaboration comprises an audio conference, establishing a collaboration communication session (block 908) comprises establishing a bidirectional media stream between each participant user device 14 (as non-limiting examples, participant user devices 14A, 14C, and 14C) and collaboration controller 12. Collaboration controller 12 begins media mixing of the media of participant user devices 14 (as non-limiting examples, 14A, 14B, and 14C), allowing participants 16 (as non-limiting examples 16A, 16B, and 16C) to communicate with each other in the collaboration 50 (block 908). At this point in the message flow, a collaboration 50 has been established including a plurality of participant user devices 14 (as non-limiting examples, 14A, 14B, and 14C) among the plurality of participant user devices 14 (as non-limiting examples, 14A, 14B, and 14C). Additional participants 16 and participant user devices 14 may also be added to the collaboration.

Collaboration controller 12 may be a focus for collaboration 50. A focus provides a centralized point of control for the collaboration 50. A focus may authorize participant user devices 14 and/or participants 16 to join the collaboration 50. A focus may authenticate the participant user devices 14 and/or the participants 16. A focus may maintain a signaling session and/or signaling dialog with each participant user device 14 participating in the collaboration 50. A focus may ensure that media for the collaboration 50 is provided to each of the participant user devices 14 participating in the collaboration 50. A focus may implement policies for the collaboration 50. The focus may be addressable by a collaboration Uniform Resource Identifier (URI). In one embodiment, collaboration controller 12 is a SIP focus, as described in RFC4353, "A Framework for Conferencing with the Session Initiation Protocol (SIP)," RFC4353, available at http://tools.ietf.org/pdf/rfc4353.pdf, incorporated herein by reference in its entirety.

An application initiation request may be received by the collaboration controller 12 (which is the focus of the collaboration 50) to request initiation of at least one collaboration application 58 after the collaboration 50 has been established (block 910). The application initiation request may comprise a collaboration identifier 106 identifying the collaboration 50 in which the plurality of participant user devices 14 (as a non-limiting example, 14A, 14B, and 14C) are participating. The application initiation request may also comprise at least one application identifier 108 identifying at least one application 58 for which at least one collaboration license 52 authorizing usage of the at least one application 58 based on the collaboration identifier 106 is requested. In response to receiving the application initiation request, application 58 may be assigned to the collaboration 50. As a result, initiation of the application 58 may be concurrently requested for use on each of the plurality of participant user devices 14 (as a non-limiting example, 14A, 14B, and 14C) in the collaboration 50 (blocks 912, 914, 916).

In some cases, one or more first participant user devices (as a non-limiting example, 14A) among the at least one participant user device 14 may have previously stored a license (which may or may not be a collaboration license 52) authorizing usage of the at least one collaboration application 58 on that one or more first participant user device 14A. In one embodiment, the one or more first participant user device 14A may have previously participated in a collaboration 50 and previously obtained (in one non-limiting example, borrowed) or otherwise obtained and stored a collaboration license 52 for at least one application 58 as herein discussed. As a result, the one or more first participant user device 14A among the at least one participant user device 14 may initiate the at least one application 58 using at least one preinstalled license (as a non-limiting example, a preinstalled collaboration license 52) authorizing usage of the at least one collaboration application 58 (block 918). However, other at least one participant user devices 14 (as a non-limiting example, 14B and 14C) among the at least one participant user device 14 may not have previously stored a license authorizing usage of the at least one collaboration application 58.

Figure 9B:
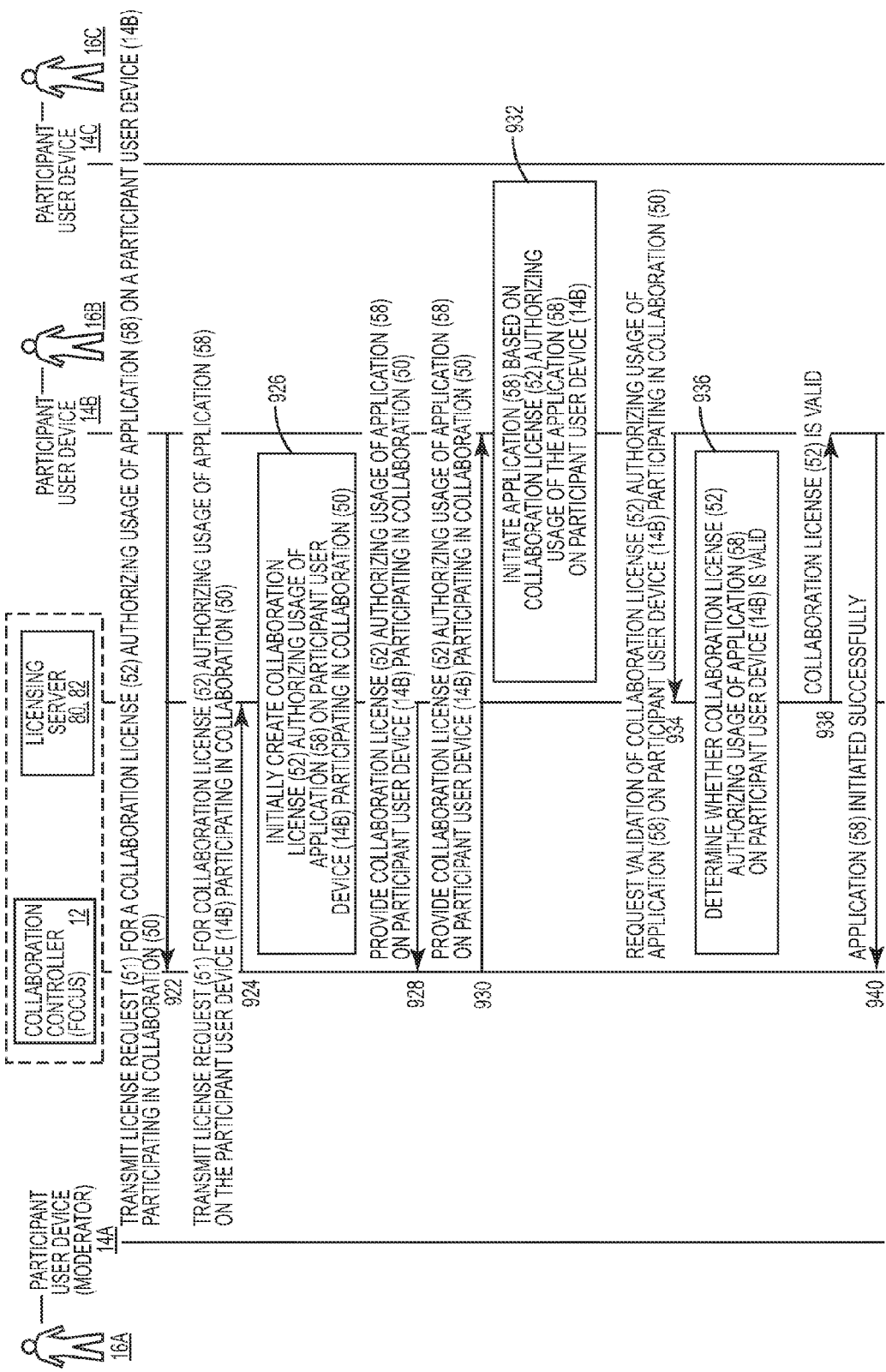
FIGS. 9B through 9C depict an exemplary message flow diagram illustrating an exemplary method for requesting at least one collaboration license for the collaboration participants, and initiating the application for the collaboration participants based on the collaboration license authorizing usage of the at least one application on at least one participant user device participating in the collaboration.
Figure 9C:
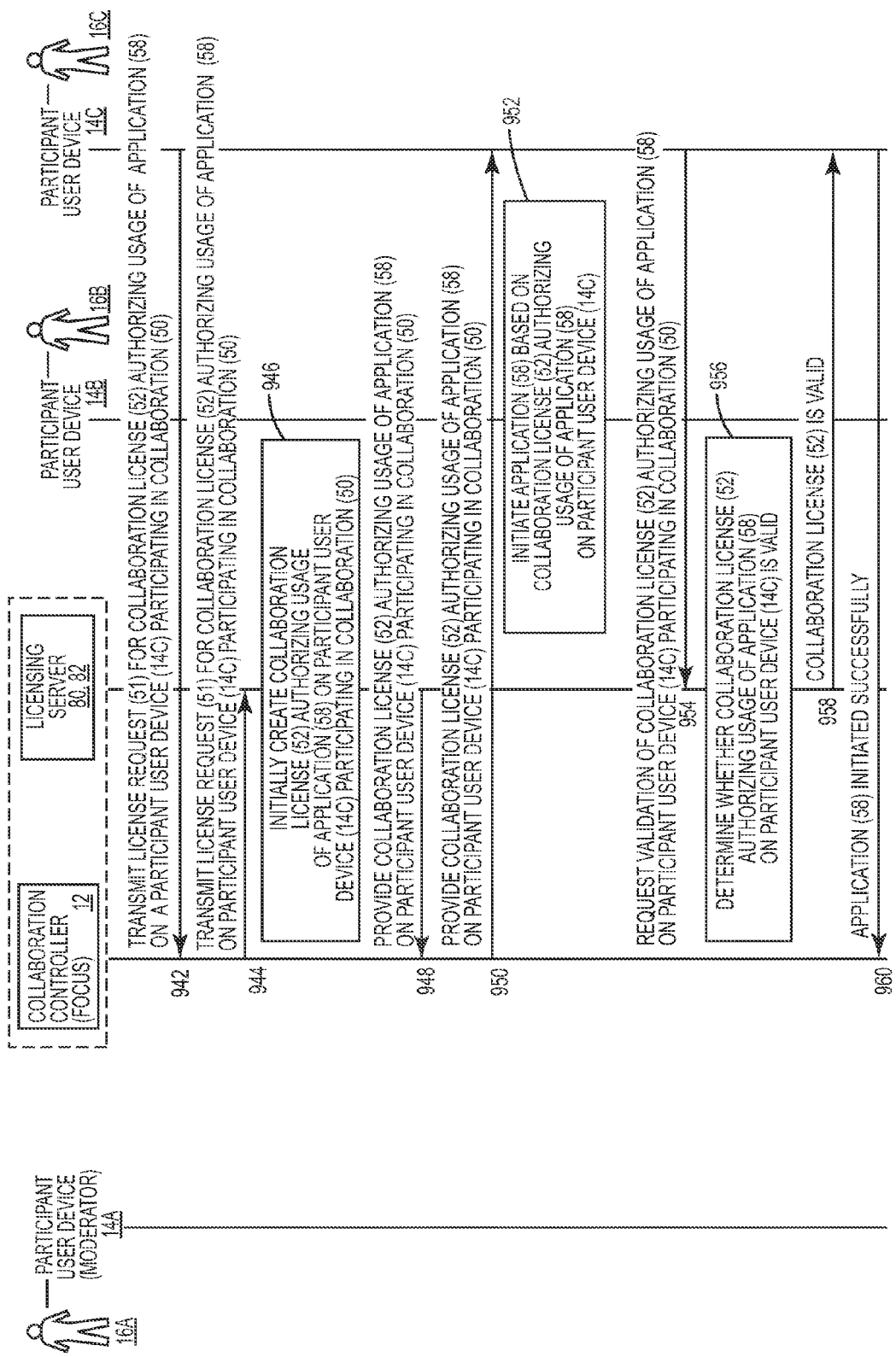

In this regard, FIGS. 9B and 9C depict exemplary message flow diagrams illustrating requesting at least one collaboration license 52 for collaboration participants 16B, 16C, and initiating the application 58 for collaboration participants 16B, 16C on participant user devices 14B, 14C based on the collaboration license 52 authorizing usage of the at least one application 58 on at least one participant user device 14 participating in the collaboration 50. FIGS. 9B and 9C provide a same message flow for both participant user device 14B and participant user device 14C. As such FIGS. 9B and 9C are discussed together in the following paragraphs.

A participant user device 14B, 14C transmits a license request for at least one collaboration license 52 authorizing usage of at least one application 58 on at least one participant user device 14B, 14C participating in the collaboration 50 (blocks 922, 942). The license request comprises a collaboration identifier 106 identifying the collaboration 50 in which the plurality of participant user devices 14 may participate. The collaboration 50 comprises at least one collaborative communication session among the plurality of participant user devices 14. The license request also comprises at least one application identifier 108 identifying at least one application 58 for which the at least one collaboration license 52 is requested. The license request is transmitted to and received by collaboration controller 12, which is a focus of the collaboration 50. In one embodiment, the license request may be a license request 51 as discussed herein regarding FIGS. 5A and 5B.

In response to receiving the license request, collaboration controller 12 transmits a second license request for at least one collaboration license 52 authorizing usage of at least one application 58 on at least one participant user device 14B, 14C participating in the collaboration 50 (blocks 924, 944). The second license request comprises the collaboration identifier 106 and the at least one application identifier 108. The second license request is transmitted to and received by a licensing server 80, 82. In one embodiment, the second license request may be a license request 51 as discussed herein regarding FIGS. 5A and 5B.

In response to receiving the license request, licensing server 80, 82 initially creates the at least one collaboration license 52 authorizing usage of the at least one application 58 on the at least one participant user device 14B, 14C participating in the collaboration 50 (blocks 926, 946). Licensing server 80, 82 may initially create the at least one collaboration license 52 based on the collaboration identifier 106 and the at least one application identifier 108 provided in blocks 924, 944.

Licensing server 80, 82 provides the created at least one collaboration license 52 authorizing usage of the at least one application 58 on the at least one participant user device 14 participating in the collaboration 50 to collaboration controller 12 (blocks 928, 948). As a non-limiting example, licensing server 80, 82 may transmit the created collaboration license 52 to collaboration controller 12. Thereafter, collaboration controller 12 provides the at least one collaboration license 52 to the participant user device 14B, 14C (blocks 930, 950). As a non-limiting example, licensing server 80, 82 may transmit the collaboration license 52 to participant user device 14B, 14C. Participant user device 14B, 14C initiates the at least one application 58 based on the at least one collaboration license 52 authorizing usage of the at least one application 58 on the at least one participant user device 14B, 14C participating in the collaboration 50 (blocks 932, 952).

Initiating the at least one application 58 based on the at least one collaboration license 52 may comprise validating the at least one collaboration license 52. In this regard, participant user device 14B, 14C may transmit to licensing server 80, 82 a validation request to validate the at least one collaboration license 52 authorizing usage of the at least one application 58 on the at least one participant user device 14B, 14C participating in the collaboration 50 (blocks 934, 954). In response to receiving the validation request (blocks 934, 954), licensing server 80, 82 may determine whether the at least one collaboration license 52 authorizing usage of the at least one application 58 on the at least one participant user device 14B, 14C participating in the collaboration 50 is valid (block 936). Licensing server 80, 82 may validate collaboration license 52 by ensuring that collaboration controller 12 and/or participant user device 14B, 14C are operating in accordance with the collaboration identifier 106, application identifier(s) 108, and policies 606 through 664 (FIGS. 6A and 6B) contained within the collaboration license 52. In this regard, licensing server 80, 82 may compare policies and/or other data of collaboration controller 12 and/or participant user device 14B, 14C to the contents of the collaboration license 52, to ensure collaboration controller 12 and/or participant user device 14B, 14C are complying with collaboration license 52.

As a non-limiting example, licensing server 80, 82 may confirm that participant user device 14B, 14C is a participant user device 14 of the collaboration 50. In one embodiment, licensing server 80, 82 may request a list of participant user devices 14 participating in collaboration 50 from collaboration controller 12. Collaboration controller 12 may provide the list of participant user devices 14 participating in collaboration 50 to licensing server 80, 82. Licensing server 80, 82 may determine whether participant user device 14B, 14C is included in that list of participant user devices 14 participating in the collaboration 50. If participant user device 14B, 14C is not included in that list, then the collaboration license 52 may not be validated by licensing server 80, 82 for use by participant user device 14B, 14C.

In another embodiment, licensing server 80, 82 may transmit a request to collaboration controller 12 to determine whether participant user device 14B, 14C is a participant user device 14 participating in collaboration 50. Collaboration controller 12 may transmit a response to licensing server 80, 82 indicating whether participant user device 14B, 14C is or is not a participant user device 14 participating in collaboration 50. If the response indicates that participant user device 14B, 14C is not a participant user device 14 participating in collaboration 50, then collaboration license 52 may not be validated by licensing server 80, 82 for use by participant user device 14B, 14C.

Licensing server 80, 82 may also validate collaboration license 52 by ensuring that the collaboration license 52 includes a valid signature (such as a valid authorizing digital signature 666 (FIG. 6B)). Licensing server 80, 82 may validate collaboration license 52 by ensuring that contents of the collaboration license 52 (including, as non-limiting examples, 106, 108, and 606 through 664 of FIGS. 6A-6B) have not been changed after the authorizing digital signature 666 was provided. In one embodiment, such a validation may be done by computing a hash (as a non-limiting example, using a cryptographic and/or one-way hash function, such as MD5) across those contents of the collaboration license 52 and comparing that hash to at least a portion of the authorizing digital signature 666. The computed hash may match that portion of the authorizing digital signature 666 if the contents have not been changed after the authorizing digital signature 666 was provided. If there is not a match, then that collaboration license 52 may be determined invalid. One of skill in the art will appreciate further license validation algorithms that may be used in accordance with this disclosure.

If it is determined that collaboration license 52 and/or that collaboration controller 12 and/or participant user device 14B, 14C conform to collaboration license 52, then licensing server 80, 82 may transmit an indication to participant user device 14B, 14C that the at least one collaboration license 52 is valid (blocks 938, 958).

In another embodiment, in lieu of performing blocks 934, 936, and 938 and/or 954, 956, and 958, participant user device 14B, 14C may locally determine whether the at least one collaboration license 52 authorizing usage of the at least one application 58 on the at least one participant user device 14B, 14C participating in the collaboration 50 is valid. Any of the herein discussed validations may be performed by participant user device 14B, 14C.

Upon determining that collaboration license 52 is valid for participant user device 14B, 14C, participant user device 14B, 14C may transmit a notification to collaboration controller 12 that the at least one application 58 initiated successfully (blocks 940, 960).

Upon determining that collaboration license 52 is not valid for participant user device 14B, 14C, participant user device 14B, 14C may transmit a notification to collaboration controller 12 that the at least one application 58 did not initiate successfully (not shown). The notification may indicate that the at least one application 58 did not initiate successfully because collaboration license 52 was invalid.

As depicted in FIGS. 9B and 9C, the at least one collaboration license 52 may be transmitted to at least one participant user device 14 for at least one non-moderator (as non-limiting examples, participant user devices 14B and 14C) of the collaboration 50.

Figure 10A:
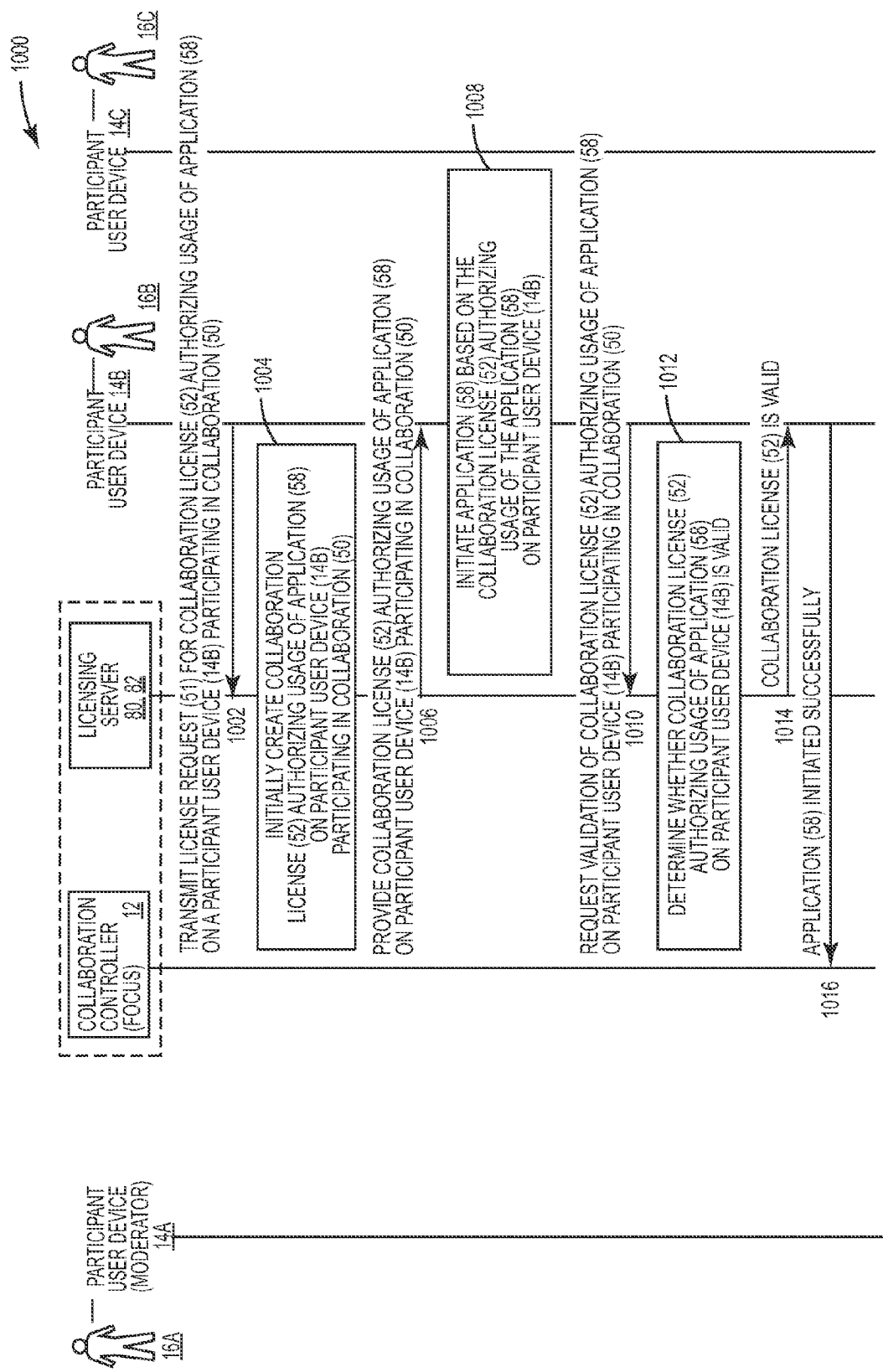
FIGS. 10A through 10B depict another exemplary message flow diagram illustrating another exemplary method for requesting at least one collaboration license for the collaboration participants, and initiating the application for the collaboration participants based on the collaboration license authorizing usage of the at least one application on at least one participant user device participating in the collaboration.
Figure 10B:
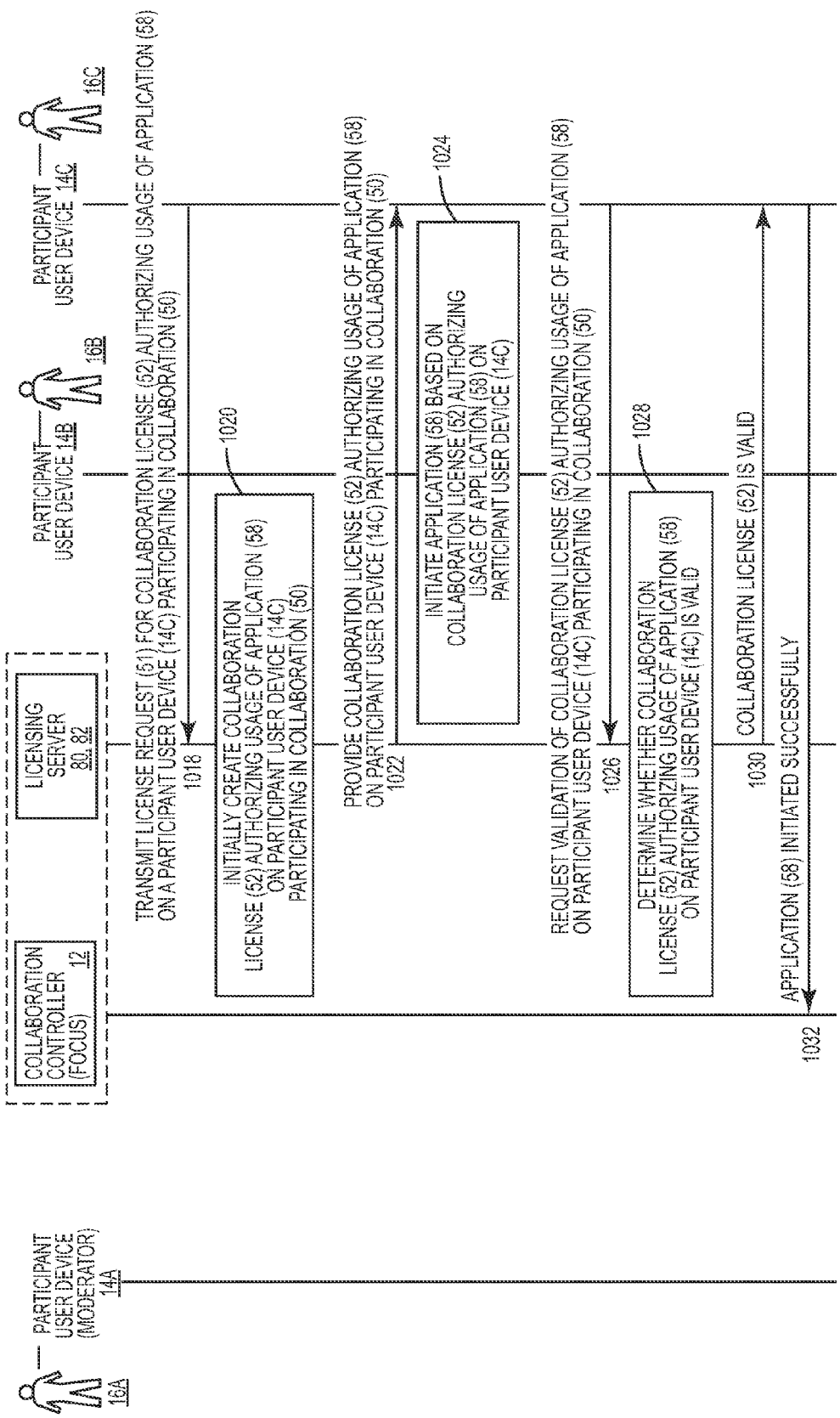

FIGS. 10A and 10B provide alternative embodiments to FIGS. 9B and 9C. In FIGS. 10A and 10B, a participant user device 14B, 14C provides its license request for at least one collaboration license 52 to licensing server 80, 82 (in lieu of providing its license request for at least one collaboration license 52 to collaboration controller 12).

In this regard, FIGS. 10A and 10B depict exemplary message flow diagrams illustrating requesting at least one collaboration license 52 for collaboration participants 16B, 16C, and initiating the application 58 for collaboration participants 16B, 16C on participant user devices 14B, 14C based on the collaboration license 52 authorizing usage of the at least one application 58 on at least one participant user device 14 participating in the collaboration 50. FIGS. 10A and 10B provide a same message flow for both participant user device 14B and participant user device 14C. As such FIGS. 10A and 10B are discussed together in the following paragraphs.

A participant user device 14B, 14C transmits a license request for at least one collaboration license 52 authorizing usage of at least one application 58 on at least one participant user device 14B, 14C participating in the collaboration 50 (blocks 1002, 1018). The license request comprises a collaboration identifier 106 identifying the collaboration 50 in which a plurality of participant user devices 14 may participate. The collaboration 50 comprises at least one collaborative communication session among the plurality of participant user devices 14. The license request also comprises at least one application identifier 108 identifying at least one application 58 for which the at least one collaboration license 52 is requested. The license request is transmitted to and received by licensing server 80, 82. In one embodiment, the license request may be a license request 51 as discussed herein regarding FIGS. 5A and 5B.

In response to receiving the license request, licensing server 80, 82 initially creates the at least one collaboration license 52 authorizing usage of the at least one application 58 on the at least one participant user device 14B, 14C participating in the collaboration 50 (blocks 1004, 1020). Licensing server 80, 82 may initially create the at least one collaboration license 52 based on the collaboration identifier 106 and the at least one application identifier 108 provided in blocks 1002, 1018.

Licensing server 80, 82 provides the created at least one collaboration license 52 authorizing usage of the at least one application 58 on the at least one participant user device 14 participating in the collaboration 50 to the participant user device 14B, 14C (blocks 1006, 1022). As a non-limiting example, licensing server 80, 82 may transmit the collaboration license 52 to participant user device 14B, 14C. Participant user device 14B, 14C initiates the at least one application 58 based on the at least one collaboration license 52 authorizing usage of the at least one application 58 on the at least one participant user device 14B, 14C participating in the collaboration 50 (blocks 1008, 1024).

Initiating the at least one application 58 based on the at least one collaboration license 52 may comprise validating the at least one collaboration license 52. In this regard, participant user device 14B, 14C may transmit to licensing server 80, 82 a validation request to validate the at least one collaboration license 52 authorizing usage of the at least one application 58 on the at least one participant user device 14B, 14C participating in the collaboration 50 (blocks 1010, 1026). In response to receiving the validation request (blocks 1010, 1026), licensing server 80, 82 may determine whether the at least one collaboration license 52 authorizing usage of the at least one application 58 on the at least one participant user device 14B, 14C participating in the collaboration 50 is valid (block 1012, 1028). Licensing server 80, 82 may validate collaboration license 52 by ensuring that collaboration controller 12 and/or participant user device 14B, 14C are operating in accordance with the collaboration identifier 106, application identifier(s) 108, and policies 606 through 664 (FIGS. 6A and 6B) contained within the collaboration license 52. In this regard, licensing server 80, 82 may compare policies and/or other data of collaboration controller 12 and/or participant user device 14B, 14C to the contents of the collaboration license 52, to ensure collaboration controller 12 and/or participant user device 14B, 14C are complying with collaboration license 52.

As a non-limiting example, licensing server 80, 82 may confirm that participant user device 14B, 14C is a participant user device 14 of the collaboration 50. In one embodiment, licensing server 80, 82 may request a list of participant user devices 14 participating in collaboration 50 from collaboration controller 12. Collaboration controller 12 may provide the list of participant user devices 14 participating in collaboration 50 to licensing server 80, 82. Licensing server 80, 82 may determine whether participant user device 14B, 14C is included in that list of participant user devices 14 participating in the collaboration 50. If participant user device 14B, 14C is not included in that list, then the collaboration license 52 may not be validated by licensing server 80, 82 for use by participant user device 14B, 14C.

In another embodiment, licensing server 80, 82 may transmit a request to collaboration controller 12 to determine whether participant user device 14B, 14C is a participant user device 14 participating in collaboration 50. Collaboration controller 12 may transmit a response to licensing server 80, 82 indicating whether participant user device 14B, 14C is or is not a participant user device 14 participating in collaboration 50. If the response indicates that participant user device 14B, 14C is not a participant user device 14 participating in collaboration 50, then collaboration license 52 may not be validated by licensing server 80, 82 for use by participant user device 14B, 14C.

Licensing server 80, 82 may also validate collaboration license 52 by ensuring that the collaboration license 52 includes a valid signature (such as a valid authorizing digital signature 666 (FIG. 6B)). Licensing server 80, 82 may validate collaboration license 52 by ensuring that contents of the collaboration license 52 (including, as non-limiting examples, collaboration identifier 106, application identifier(s) 108, and policies 606 through 664 (FIGS.

6A-6B) have not been changed after the authorizing digital signature 666 was provided. In one embodiment, such a validation may be done by computing a hash (as a non-limiting example, using a cryptographic and/or one-way hash function, such as MD5) across those contents of the collaboration license 52 and comparing that hash to at least a portion of the authorizing digital signature 666. One of skill in the art will appreciate further license validation algorithms that may be used in accordance with this disclosure.

If it is determined that collaboration license 52 and/or that collaboration controller 12 and/or participant user device 14B, 14C conform to collaboration license 52, then licensing server 80, 82 may transmit an indication to participant user device 14B, 14C that the at least one collaboration license 52 is valid (blocks 1014, 1030).

In another embodiment, in lieu of performing blocks 1010, 1012, and 1014 and/or 1026, 1028, and 1030, participant user device 14B, 14C may locally determine whether the at least one collaboration license 52 authorizing usage of the at least one application 58 on the at least one participant user device 14B, 14C participating in the collaboration 50 is valid. Any of the herein discussed validations may be performed by participant user device 14B, 14C.

Upon determining that collaboration license 52 is valid for participant user device 14B, 14C, participant user device 14B, 14C may transmit a notification to collaboration controller 12 that the at least one application 58 initiated successfully (blocks 1016, 1032).

Upon determining that collaboration license 52 is not valid for participant user device 14B, 14C, participant user device 14B, 14C may transmit a notification to collaboration controller 12 that the at least one application 58 did not initiate successfully (not shown). The notification may indicate that the at least one application 58 did not initiate successfully because collaboration license 52 was invalid.

Figure 11A:
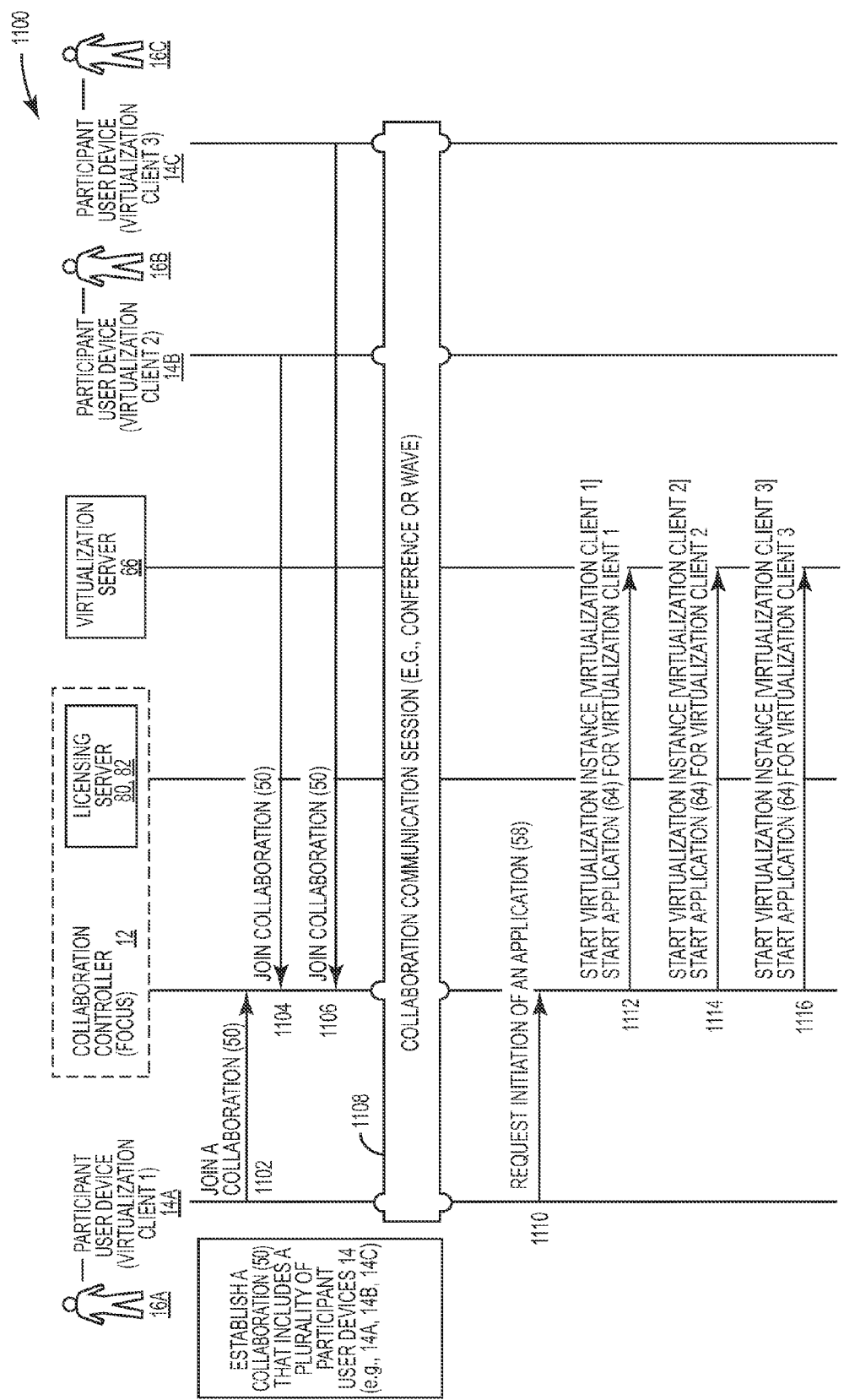
FIG. 11A depicts an exemplary message flow diagram illustrating an exemplary method for establishing a collaboration and for requesting initiation of at least one application for the collaboration participants.
Figure 11B:
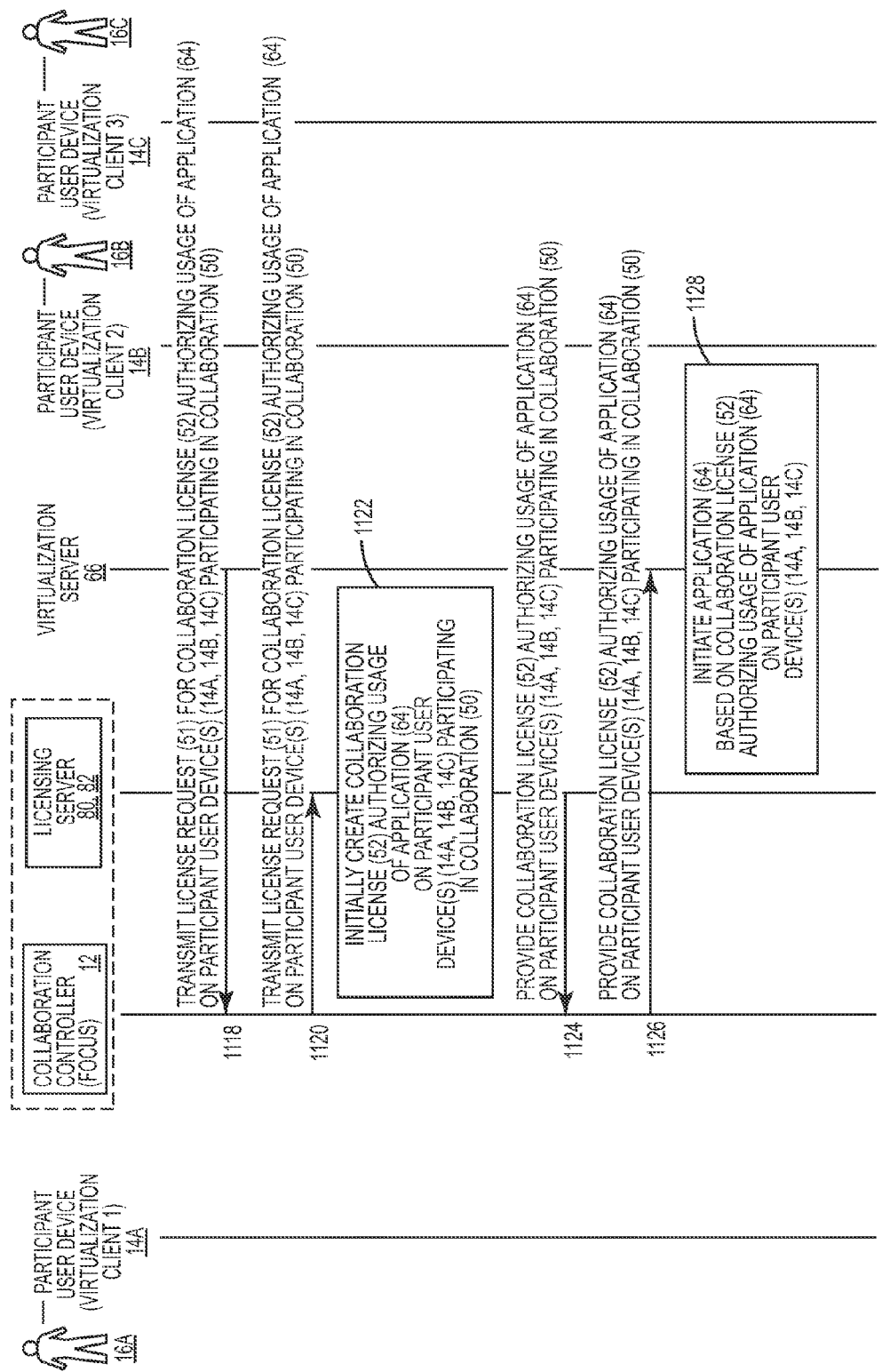
FIGS. 11B through 11C depict an exemplary message flow diagram illustrating an exemplary method for requesting at least one collaboration license for the collaboration participants, and initiating the application for the collaboration participants based on the collaboration license authorizing usage of the at least one application on at least one participant user device participating in the collaboration.
Figure 11C:
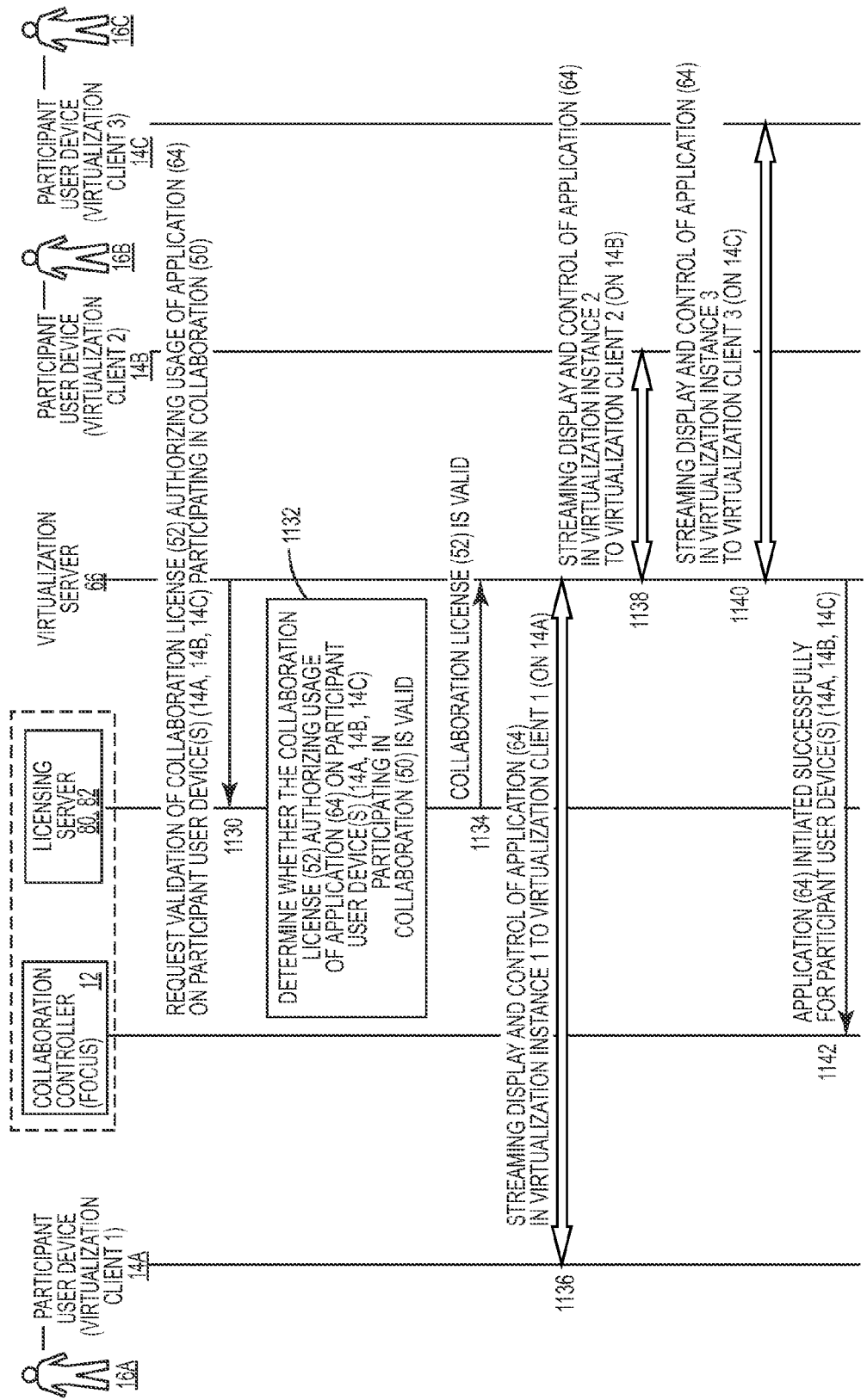

Referring now to FIGS. 11A, 11B, and 11C, in one embodiment, requesting initiation of the application 58 for use on each of the plurality of participant user devices 14 in the collaboration 50 (FIG. 9A, block 910) may comprise concurrently requesting initiation of an application instance 64 on a virtualization server 66 for each of the plurality of participant user devices 14 in the collaboration 50. Each such application instance 64 initiated on the virtualization server 66 may be configured to provide display and control of the application instance 64 to a different participant user device 14 in the collaboration 50. FIGS. 11A, 11B, and 11C provide a method 1100 illustrating one such embodiment. Such embodiments may be referred to as cloud computing embodiments. Virtualization server 66 may comprise a plurality of virtualization servers 66. Accordingly, a first application instance 64 may execute on a first virtualization server 66 whereas a second application instance 64 may execute on a second virtualization server 66. In this regard, concurrently requesting initiation of an application instance 64 on a virtualization server 66 for each of the plurality of participant user devices 14 in the collaboration 50 may comprise concurrently requesting initiation of an application instance 64 on one among a plurality of virtualization servers 66 for each of the plurality of participant user devices 14 in the collaboration 50. Some or all of the application instances 64 may execute on a same virtualization server 66. Some of the application instances 64 may execute on different virtualization servers 66. Each of the application instances 64 may execute on a different virtualization server 66. Accordingly, concurrently requesting initiation of the application 58 for use on each of the plurality of participant user devices 14 in the collaboration 50 (FIG. 9A, block 910) may comprise concurrently requesting initiation of at least one application instance 64 on at least one virtualization server 66 for each of the plurality of participant user devices 14 in the collaboration 50. Each such application instance 64 is configured to provide display and control of the application instance 64 to a different participant user device 14 in the collaboration 50.

In this regard, FIG. 11A depicts an exemplary message flow diagram illustrating an exemplary method 1100 for establishing a collaboration 50 and for requesting initiation of at least one application 58 for participant user devices 14. Method 1100 comprises establishing a collaboration 50 that includes a plurality of participant user devices 14. In this regard, participant user devices 14A, 14B, and 14C join the collaboration 50 (blocks 1102, 1104, 1106). In one embodiment, at least one participant user device 14 may join the collaboration 50 by transmitting at least one collaboration join request (blocks 1102, 1104, 1106) to join the collaboration 50 (as depicted in FIG. 11A). The at least one collaboration join request may be transmitted to collaboration controller 12, which may be a focus for the collaboration 50. In another embodiment, at least one participant user device 14 may join the collaboration 50 by being joined to the collaboration 50, as herein also discussed.

A communication session is established among the participant user devices 14 participating in the collaboration 50 (block 1108). In one embodiment, the collaboration 50 may be a conference. In another embodiment, collaboration 50 may be a wave. Collaboration controller 12 may be a focus for one or more collaborations 50. A collaboration identifier 106 uniquely identifies each collaboration 50.

An application initiation request may be received by the collaboration controller 12 (which is a focus of the collaboration 50) to request initiation of at least one application 58 (block 1110) after the collaboration 50 has been established. The application initiation request may comprise a collaboration identifier 106 identifying the collaboration 50 in which the plurality of participant user devices 14 (as a non-limiting example, 14A, 14B, and 14C) are participating. The application initiation request may also comprise at least one application identifier 108 identifying at least one application 58 for which at least one collaboration license 52 authorizing usage of the at least one application 58 based on the collaboration identifier 106 is requested. In response to receiving the application initiation request, application 58 may be assigned to the collaboration 50. As a result, initiation of the application 58 may be concurrently requested for use on each of the plurality of participant user devices 14 (as a non-limiting example, 14A, 14B, and 14C) in the collaboration 50. In this embodiment requesting initiation of the at least one application 58 for use on the at least one participant user device 14 participating in the collaboration 50 comprises requesting initiation of at least one application instance 64 on at least one virtualization server 66 for at least one participant user device 14 among the plurality of participant user devices 14 participating in the collaboration 50 (blocks 1112, 1114, 1116). As depicted in FIG. 11C, each started application instance 64 is configured to provide display and control of the application instance 64 to a different participant user device 14 participating in the collaboration 50 (blocks 1136, 1138, and 1140).

As depicted in FIG. 11A, in response to the application initiation requests to initiate an application instance 64 on the virtualization server 66 for participant user devices 14A, 14B, and 14C (blocks 1112, 1114, 1116), virtualization server 66 transmits a license request 51 for at least one collaboration license 52 authorizing usage of the at least one application instance 64 on virtualization server 66 for the at least one participant user device 14A, 14B, and 14C participating in the collaboration 50 (block 1118). The license request 51 comprises a collaboration identifier 106 identifying the collaboration 50 in which participant user devices 14A, 14B, and 14C are participating. The license request 51 further comprises at least one application identifier 108 identifying the application 58 for which the at least one application instances 64 are requested. In this embodiment, the license request 51 is transmitted from virtualization server 66 to collaboration controller 12 (block 1118), and a second such license request 51 is transmitted from collaboration controller 12 to licensing server 80, 82 (block 1120). In another embodiment, the license request 51 may be directly transmitted from virtualization server 66 to licensing server 80, 82. In response to receiving the license request 51 for at least one collaboration license 52 authorizing usage of the at least one application 58 on at least one participant user device participating in the collaboration 50, licensing server 80, 82 may initially create the at least one collaboration license 52 authorizing usage of the at least one application instance 64 on virtualization server 66 for the at least one participant user device 14A, 14B, 14C participating in the collaboration 50 (block 1122).

With continuing reference to FIG. 11A, in this embodiment, licensing server 80, 82 provides the at least one collaboration license 52 authorizing usage of the at least one application instance 64 on virtualization server 66 for the at least one participant user device 14A, 14B, 14C participating in the collaboration 50 (block 1124). Collaboration controller 12 provides the at least one collaboration license 52 authorizing usage of the at least one application instance 64 on virtualization server 66 for the at least one participant user device 14A, 14B, 14C participating in the collaboration 50 (block 1126).

In another embodiment, in lieu of blocks 1124 and 1126, licensing server 80, 82 provides directly to virtualization server 66 the at least one collaboration license 52 authorizing usage of the at least one application instance 64 on virtualization server 66 for the at least one participant user device 14A, 14B, 14C.

In response to receiving the at least one collaboration license 52, virtualization server 66 initiates the at least one application 58 (by initiating at least one application instance 64 on virtualization server 66) for the at least one participant user devices 14A, 14B, 14C based on the at least one collaboration license 52 authorizing usage of the at least one application 58 (here, authorizing the at least one application instance 64 on virtualization server 66) for the at least one participant user devices 14A, 14B, 14C participating in the collaboration 50 (block 1128).

Referring now to FIG. 11C, the at least one application instance 64 executing on virtualization server 66 may request validation of the at least one collaboration license 52 authorizing usage of the at least one application 58 (here, authorizing usage of the at least one application instance 64 on virtualization server 66) for the at least one participant user device 14A, 14B,14C participating in the collaboration 50 (block 1130). This validation request may comprise the collaboration identifier 106, the at least one application identifier 108, and/or the at least one collaboration license 52.

In response to receiving the validation request, licensing server 80, 82 determines whether the at least one collaboration license 52 authorizing usage of the at least one application 58 (here, at least one application instance 64) for the at least one participant user device 14A, 14B, 14C participating in the collaboration 50 is valid (block 1132). Licensing server 80, 82 may validate the at least one collaboration license 52 using any of the validation mechanisms herein discussed. One of skill in the art will appreciate a range of validation mechanisms that may be used in accordance with this disclosure. If licensing server 80, 82 determines the at least one collaboration license 52 to be valid, licensing server 80, 82 notifies the at least one application instances 64 executing on virtualization server 66 that the collaboration license 52 is valid (block 1134). If licensing server 80, 82 determines the at least one collaboration license 52 is not valid, licensing server 80, 82 notifies the at least one application instances 64 executing on virtualization server 66 that the collaboration license 52 is not valid (not shown).

In another embodiment, in lieu of performing blocks 1130, 1132, and 1134, the at least one application instances 64 executing on virtualization server 66 may locally determine whether the at least one collaboration license 52 authorizing usage of the at least one application 58 (here, at least one application instances 64 executing on virtualization server 66) for the at least one participant user device 14A, 14B, 14C participating in the collaboration 50 is valid. Any of the herein discussed validations may be performed by the at least one application instances 64 executing on virtualization server 66 for the at least one participant user device 14A, 14B, 14C.

Upon determining that collaboration license 52 is valid for the at least one application instance 64 executing on virtualization server 66 for the at least one participant user device 14A, 14B, 14C, the at least one application instance 64 executing on virtualization server 66 may transmit a notification to collaboration controller 12 that the at least one application 58 initiated successfully (blocks 1134). Once collaboration license 52 is determined to be valid (as a non-limiting example, by the at least one application instance 64 executing on virtualization server 66 for the at least one participant user device 14A, 14B, 14C), display and control of the at least one application 58 (here display and control of at least one application instance 64 for at least one application 58) is provided to a virtualization client 68 (FIG. 2) of each at least one participant user device 14A, 14B, 14C (blocks 1136, 1138, 1140). Thereafter, the at least one application instance 64 executing on virtualization server 66 may transmit a notification that the at least one application 58 (here the at least one application instance 64) has initiated successfully for the at least one participant user device 14A, 14B, 14C (step 1142).

Collaboration controller 12 may pre-request at least one collaboration license 52 prior to receiving a license request (as a non-limiting example, a license request 51) for the at least one collaboration license 52. As a non-limiting example, collaboration controller 12 may store the pre-requested at least one collaboration license 52 in a collaboration license pool, such as collaboration license pool 826, 834 (FIG. 8). Thereafter, collaboration controller 12 may provide at least one collaboration license 52 from the collaboration license pool (as non-limiting examples, at least one collaboration pool 826, 834) in lieu of requesting at least one collaboration license 52 from licensing server 80, 82 (as non-limiting examples, in lieu of blocks 924, 926, 928 (FIG. 9B), blocks 944, 946, 948 (FIG. 9C), and/or blocks 1120, 1122, 1124 (FIGS. 11B).

Figure 12:
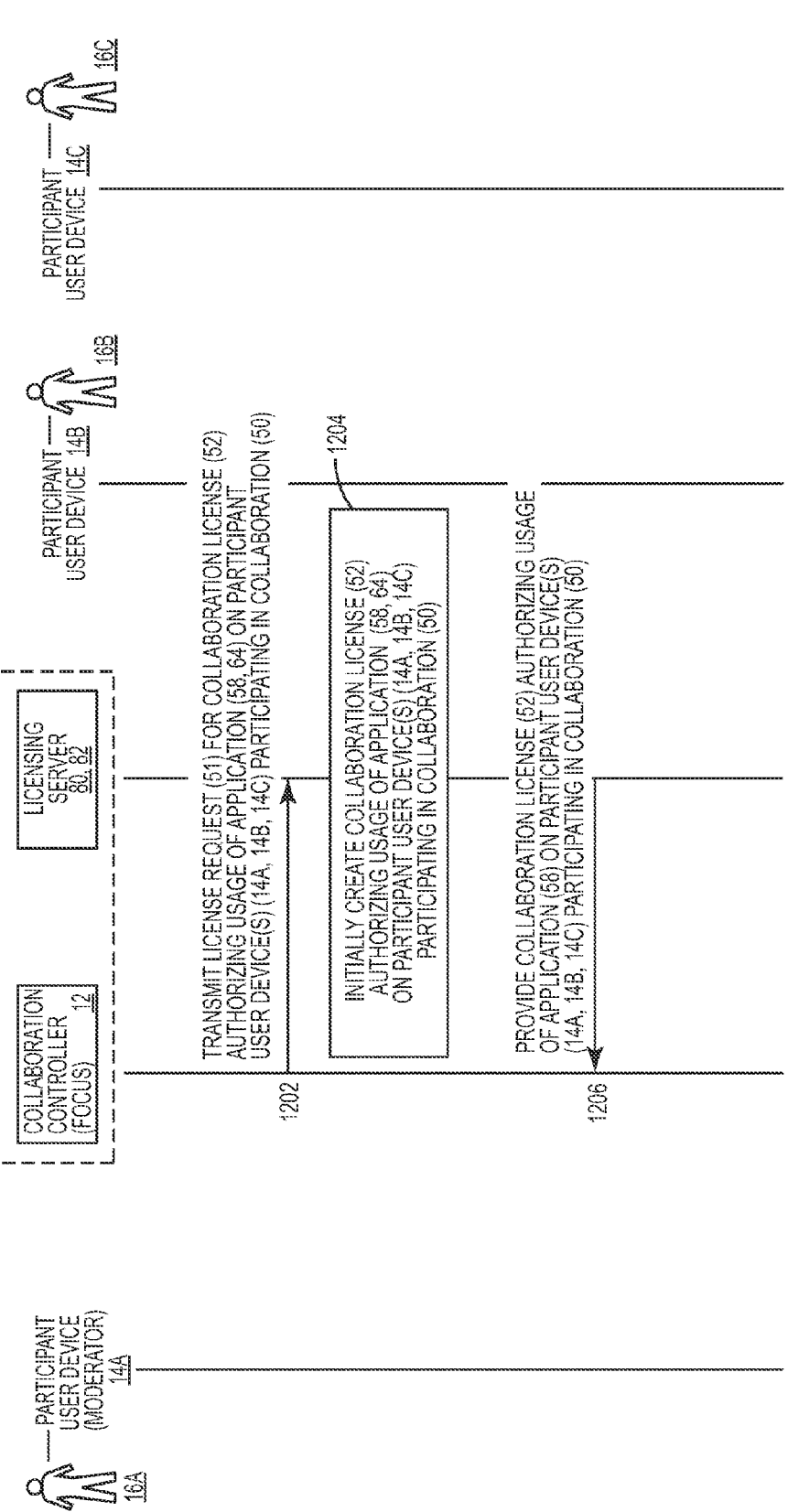
FIG. 12 depicts an exemplary message flow diagram for requesting at least one collaboration license authorizing usage of at least one application on at least one participant user device participating in a collaboration.

In this regard, FIG. 12 provides a method 1200 for pre-requesting at least one collaboration license 52. Method 1200 may be executed by a collaboration controller 12. As depicted in FIG. 12, pre-requesting the at least one collaboration license 52 may comprise transmitting a license request for at least one collaboration license 52 authorizing usage of at least one application 58, 64 for at least one participant user device 14A, 14B, 14C participating in a collaboration 50 (block 1202). The license request comprises a collaboration identifier 106 identifying the collaboration 50 in which a plurality of participant user devices 14 may participate. The license request also comprises at least one application identifier 108 identifying at least one application 58 for which the at least one collaboration license 52 is requested. The license request is transmitted to and received by licensing server 80, 82. In one embodiment, the license request may be a license request 51 as discussed herein regarding FIGS. 5A and 5B.

In response to receiving the license request, licensing server 80, 82 initially creates the at least one collaboration license 52 authorizing usage of the at least one application 58 on the at least one participant user device 14A, 14B, 14C participating in the collaboration 50 (block 1204). Licensing server 80, 82 may initially create the at least one collaboration license 52 based on the collaboration identifier 106 and the at least one application identifier 108 provided in blocks 1202.

Licensing server 80, 82 provides the created at least one collaboration license 52 authorizing usage of the at least one application 58 on the at least one participant user device 14 participating in the collaboration 50 to collaboration controller 12 (block 1206). Collaboration controller 12 may store the provided at least one collaboration license 52 and later provide the stored at least one collaboration license 52 to at least one participant user device 14 in lieu of transmitting a license request to licensing server 80, 82 for at least one collaboration license 52 (as non-limiting example, in lieu of blocks 924, 926, 928 (FIG. 9B), blocks 944, 946, 948 (FIG. 9C), and/or blocks 1120, 1122, 1124 (FIGS. 11B).

Figure 13:
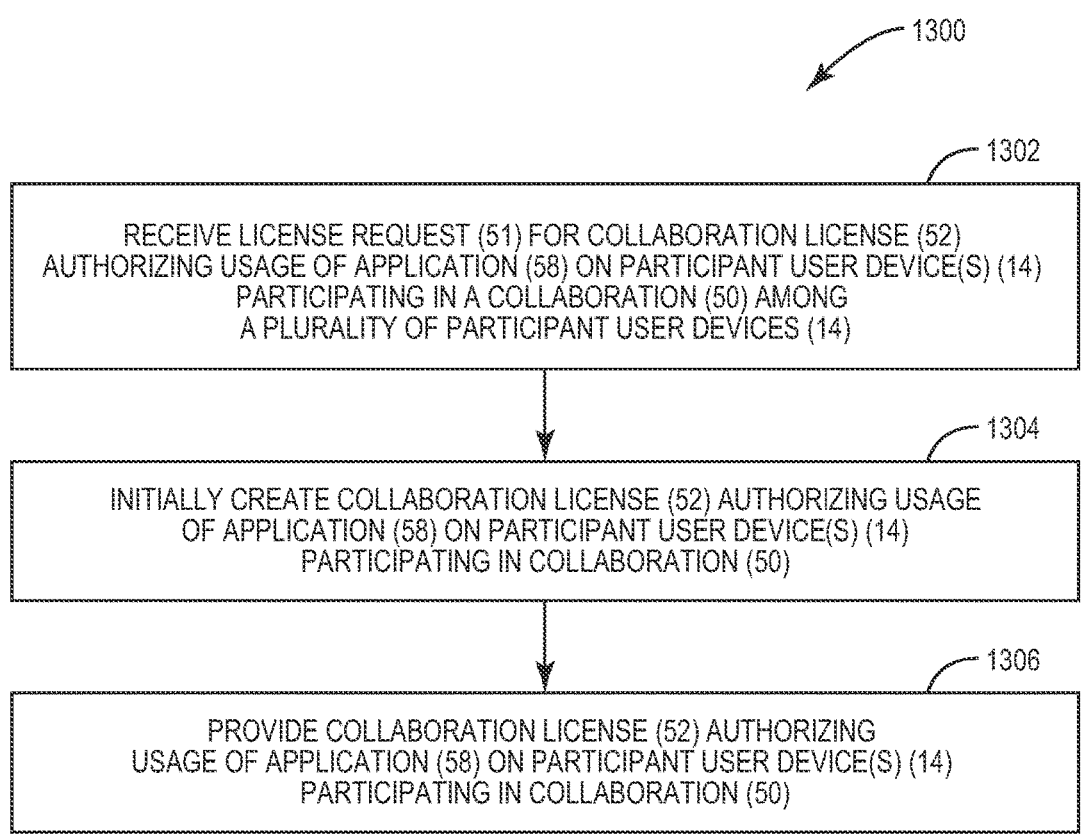
FIG. 13 depicts an exemplary message flow diagram for a licensing server.

FIG. 13 depicts an exemplary message flow diagram illustrating an exemplary method 1300 for a licensing server (as non-limiting examples a licensing server 80, 82). Method 1300 comprises receiving a license request 51 for at least one collaboration license 52 authorizing usage of at least one application 58 on at least one participant user device 14 participating in a collaboration 50 among a plurality of participant user devices 14 (block 1302). The license request 51 comprises a collaboration identifier 106 identifying a collaboration 50 in which the plurality of participant user devices 14 may participate. The collaboration 50 may comprise at least one collaborative communication session among the plurality of participant user devices 14 participating in the collaboration 50. The license request 51 further comprises at least one application identifier 108 identifying at least one application 58 for which the at least one collaboration license 52 is requested. The license request 51 may be received from a collaboration controller 12. The license request 51 may be received from a participant user device 14 participating in the collaboration 50.

Method 1300 further comprises initially creating the at least one collaboration license 52 authorizing usage of the at least one application 58 on the at least one participant user device 14 participating in the collaboration 50 (block 1304). The at least one collaboration license 52 is also initially created based on the at least one application identifier 108 identifying the at least one application 58 for which the at least one collaboration license 52 is requested. The at least one collaboration license 52 is also initially created based on the collaboration identifier 106 identifying the collaboration 50 in which the plurality of participant user devices 14 may participate.

Method 1300 further comprises providing the at least one collaboration license 52 authorizing usage of the at least one application 58 on the at least one participant user device 14 participating in the collaboration 50 (step 1306). The at least one collaboration license 52 may be provided based on the at least one application identifier 108 and also based on the collaboration identifier 106 identifying the collaboration 50 in which the plurality of participant user devices 14 may participate. The at least one collaboration license 52 may be provided to collaboration controller 12. Collaboration controller 12 may be a focus of the collaboration 50. The at least one collaboration controller 12 may be provided to a participant user device 14 participating in the collaboration 50. Providing the at least one collaboration license 52 may comprise transmitting the at least one collaboration license 52.

Figure 14:
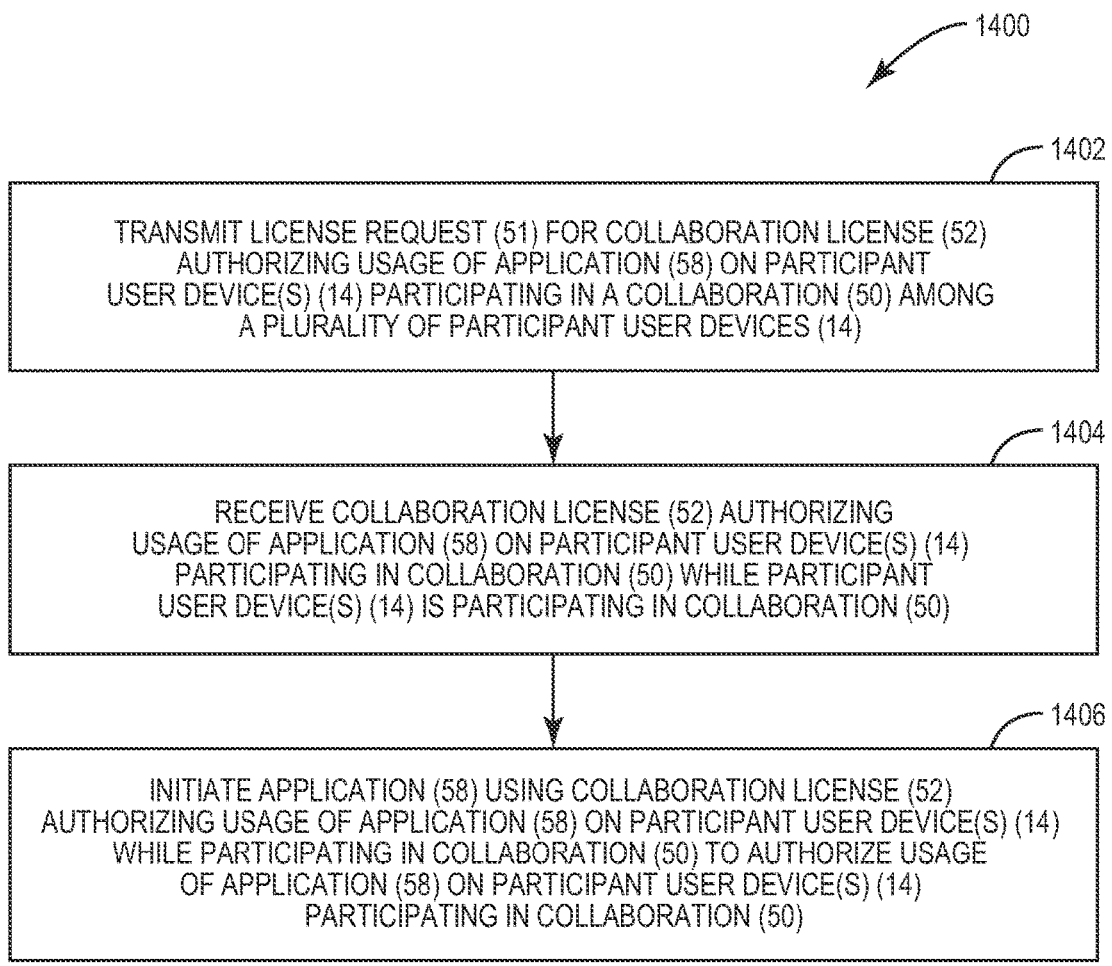
FIG. 14 depicts an exemplary message flow diagram for a participant user device.

FIG. 14 depicts an exemplary message flow diagram illustrating an exemplary method 1400 for a participant user device 14 (as non-limiting examples, a participant user device 14A, 14B, and/or 14C).

Method 1400 comprises transmitting a license request 51 for at least one collaboration license 52 authorizing usage of at least one application 58 on at least one participant user device 14 participating in a collaboration 50 among a plurality of participant user devices 14 participating in the collaboration 50 (block 1402). The collaboration 50 comprises at least one collaborative communication session among the plurality of participant user devices 14. The license request 51 comprises a collaboration identifier 106 identifying the collaboration 50 in which the at least one participant user device 14 is participating. The license request 51 further comprises at least one application identifier 108 identifying at least one application 58 for which at least one collaboration license 52 authorizing usage of the at least one application 58 based on the collaboration identifier 106 is being requested.

Method 1400 may further comprise receiving the at least one collaboration license 52 authorizing, based on the collaboration identifier 106, usage of the at least one application 58 on the at least one participant user device 14 participating in the collaboration 50 while the participant user device 14 is participating in the collaboration 50 (block 1404).

Method 1400 may further comprise initiating the at least one application 58 using the at least one collaboration license 52 authorizing usage of the at least one application 58 on the at least one participant user device 14 while participating in the collaboration 50 to authorize usage of the at least one application 58 on the at least one participant user device 14 participating in the collaboration 50 (block 1406).

An application 58 or application instance 64 may provide any type of application for the participants 16 of a collaboration 50. As non-limiting examples, the application 58 or application instance 64 may be any of or any combination of a whiteboard application, a spreadsheet application, a text editing application, a slide presentation application, a database client application, a web browser application, an action item management application, a task management application, a personal agent application (as a non-limiting example, a personal agent application for gathering group information), a transcription application, a translation application, a polling application, a personal productivity application, a business application, an application for integrating business processes, and/or any type of business productivity application. One of skill in the art will appreciate other applications which may be provided in accordance with this disclosure.

Embodiments described herein may be implemented in hardware, software, or a combination thereof. When implemented in software, the software comprises software instructions which may be executed on a processor, such as the processor 42, to cause the processing device, such as a collaboration controller 12, a participant user device 14, and/or a licensing server 80, 82 to implement the functionality described herein. Thus, embodiments may be implemented as a computer program product, such as a computer-usable or computer-readable medium having a computer-readable program code embodied therein. The computer-readable program code can include the software instructions for implementing the functionality of the embodiments described herein.

In one embodiment, the collaboration controller 12 offers a collaboration application programming interface (API) 56 (FIG. 2) which enables an application 58 to communicate with the collaboration controller 12. Each separate application instance 64 of the application 58 may be configured to communicate to the collaboration controller 12 through the collaboration application programming interface (API) 56 of the collaboration controller 12. The collaboration application programming interface (API) 56 may also be used as an interface for a participant user device 14 to communicate to other participant user devices 14 participating in a collaboration 50. In this regard, each separate application instance 64 of the application 58 may be configured to communicate through the collaboration application programming interface (API) 56 of the collaboration controller 12 to each of the other application instances 64 initiating and executing for other participant user devices 14 in the collaboration 50. As a non-limiting example, in one embodiment, any of the herein mentioned implementations of application 58 provided on a participant user device 14A for a collaboration participant 16A may use the collaboration application programming interface (API) 56 to communicate with other applications 58 executing on other participant user devices 14B, 14C, 14D for other participants 16B, 16C, 16D of a same collaboration 50 through the collaboration application programming interface (API) 56 of the collaboration controller 12.

Those of skill in the art will appreciate that, in accordance with this disclosure, an application 58 may be implemented using a combination of any of the herein discussed methods. As a non-limiting example, portions of the application 58 may be provided from a web client 60 and web server 62, further portions of the application 58 may be provided from an application client 70 and application server 72, further portions of the application 58 may be provided from an application instance 64 executing on a virtualization server 66, and further portions of the application 58 may be provided as an application 58 executing directly on the participant user device 14. Any combination of such methods may provide the application 58 on the participant user device 14 for a collaboration participant 16. In one embodiment, the collaboration controller 12 may determine whether an application 58 is available on a participant user device 14 in the collaboration 50. In response to determining that the application 58 is not available on the participant user device 14 in the collaboration 50, the application 58 may be downloaded from the storage device 74 to the participant user device 14 in the collaboration 50.

As may be appreciated by one of skill in the art from the disclosures provided herein, any of the servers, devices, or other components herein disclosed may be provided as a plurality of those servers, devices, or components. Providing a plurality of the servers, devices, or other components may increase the capacity and/or redundancy of those servers, devices, or other components. Certain non-limiting examples are now provided. Collaboration controller 12 may be provided as a plurality of collaboration controllers 12. Any one participant user device 14A, 14B, 14C, and/or 14D may be provided as a plurality of participant user devices 14A, 14B, 14C, and/or 14D. Web server 62 may be provided as a plurality of web servers 62. Virtualization server 66 may be provided as a plurality of virtualization servers 66. Storage device 74 may be provided as a plurality of storage devices 74. Licensing servers 80 may be provided as a plurality of licensing servers 80. Accounting server 84 may be provided as a plurality of accounting servers 84.

Figure 15:
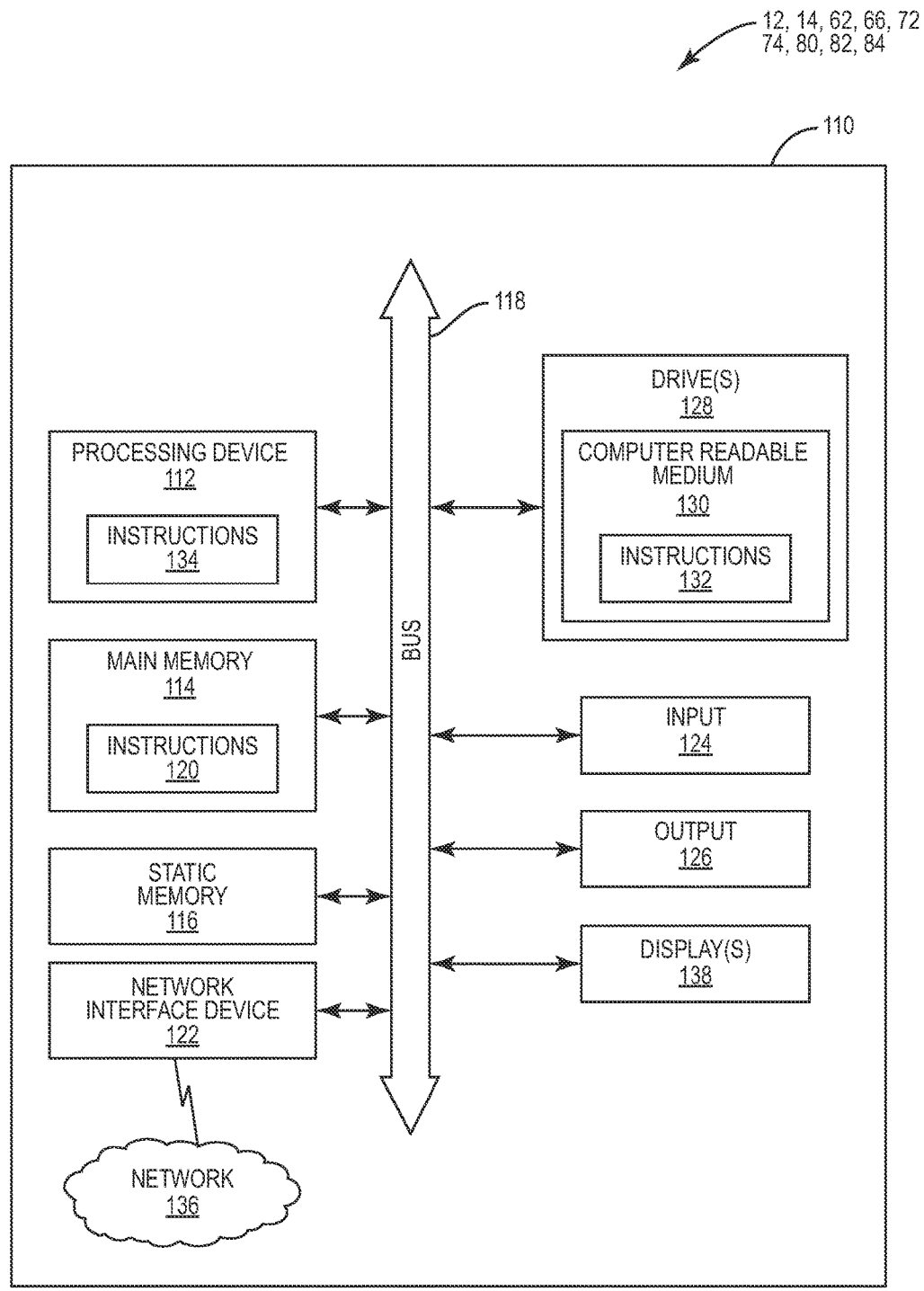
FIG. 15 is a schematic diagram representation of an exemplary device in the system of FIG. 2, for implementing a collaboration controller, a licensing server, a participant user device, a web server, a virtualization server, an application server, a storage device, and/or an accounting server, and configured to execute instructions from an exemplary computer-readable medium to perform the functions described herein.

FIG. 15 provides a schematic diagram representation of collaboration controller 12 in the exemplary form of an exemplary computer system 110 adapted to execute instructions from an exemplary computer-readable medium to perform the functions described herein. In this regard, the collaboration controller 12 may comprise the computer system 110 within which a set of instructions for causing the collaboration controller 12 to perform any one or more of the methodologies discussed herein may be executed. The collaboration controller 12 may be connected (as a non-limiting example, networked) to other machines in a local area network (LAN), an intranet, an extranet, or the Internet. The collaboration controller 12 may operate in a client-server network environment, or as a peer machine in a peer-to-peer (or distributed) network environment. While only a single collaboration controller 12 is illustrated, the terms "controller" and "server" shall also be taken to include any collection of machines that individually or jointly execute a set (or multiple sets) of instructions to perform any one or more of the methodologies discussed herein. The collaboration controller 12 may be a server, a personal computer, a desktop computer, a laptop computer, a personal digital assistant (PDA), a computing pad, a mobile device, or any other device and may represent, as non-limiting examples, a server or a user's computer.

The exemplary computer system 110 includes a processing device or processor 112, a main memory 114 (as non-limiting examples, read-only memory (ROM), flash memory, dynamic random access memory (DRAM) such as synchronous DRAM (SDRAM), etc.), and a static memory 116 (as non-limiting examples, flash memory, static random access memory (SRAM), etc.), which may communicate with each other via a bus 118. Alternatively, the processing device 112 may be connected to the main memory 114 and/or the static memory 116 directly or via some other connectivity means.

The processing device 112 represents one or more processing devices such as a microprocessor, central processing unit, or the like. More particularly, the processing device 112 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 112 is configured to execute processing logic in instructions 120 and/or cached instructions 134 for performing the operations and steps discussed herein.

The computer system 110 may further include a communications interface in the form of a network interface device 122. It also may or may not include an input 124 to receive input and selections to be communicated to the computer system 110 when executing instructions. It also may or may not include an output 126, including but not limited to display(s) 138, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 110 may or may not include a data storage device that includes using drive(s) 128 to store functions herein described in computer-readable medium 130 on which is stored one or more sets of instructions 132 (e.g., software) embodying any one or more of the methodologies or functions described herein. The functions can include the methods 100, 300, 400, 900, 1000, 1100, 1200, 1300, and/or 1400 and/or other functions of the collaboration controller 12, participant user device 14, and/or licensing server 80, 82 as non-limiting examples. The instructions 132 may also reside, completely or at least partially, within the main memory 114 and/or within the processing device 112 during execution thereof by the computer system 110, the main memory 114 and the processing device 112 also constituting machine-accessible storage media. The instructions 120, 132, and/or 134 may further be transmitted or received over a network 136 via the network interface device 122. The network 136 can be an intra-network or an inter-network.

While the computer-readable medium 130 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, optical and magnetic media, and carrier wave signals.

As also depicted in FIG. 15, a licensing server 80, 82, a participant user device 14, a web server 62, a virtualization server 66, an application server 72, a storage device 74, and/or an accounting server 84 may also each be provided in the form of an exemplary computer system 110.

The devices, systems, methods, and computer-readable mediums initiating one or more applications 58 for participants 16 of a collaboration 50 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer-implemented method for licensing an application, comprising:
   initiating, by a processor of a collaboration controller, a collaborative communication session among a plurality of participant user devices, the collaborative communication session comprising a real-time information exchange between the plurality of participant user devices and concurrent use of the application by each of the plurality of participant user devices during the collaborative communication session;
   determining, by the processor of the collaboration controller, whether each of the plurality of participant user devices in the collaborative communication session is licensed to use the application;
   in response to determining that at least one participant user device of the plurality of participant user devices in the collaborative communication session is not licensed to use the application, transmitting, by the processor of the collaboration controller, to a licensing server, a license request for a collaboration license authorizing usage of the application on the at least one participant user device determined not to be licensed to use the application;
   receiving, by the processor of the collaboration controller, from the licensing server, the collaboration license authorizing usage of the application on the at least one participant user device for a period of time that ends no later than at the end time of the collaborative communication session;
   providing, by the processor of the collaboration controller, the collaboration license to the at least one participant user device, wherein the at least one participant user device requests validation of the collaboration license from the licensing server; and
   requesting, by the processor of the collaboration controller, initiation of the application for use on the at least one participant user device based on the collaboration license, wherein requesting initiation of the application for use on the at least one participant user device comprises requesting initiation of an application instance on a virtualization server for each participant user device among the plurality of participant user devices participating in the collaborative communication session, each application instance configured to provide display and control of the application instance to a different participant user device participating in the collaborative communication session.

2. The method of claim 1, wherein the collaborative communication session is at least one of an active collaboration, a conference, an audio conference, a video conference, a text chat conference, or a wave.

3. The method of claim 1, wherein the license request comprises:
   a collaboration identifier identifying the collaborative communication session in which the plurality of participant user devices may participate, and
   an application identifier identifying the application for which the collaboration license is requested.

4. The method of claim 1, wherein initiating the collaborative communication session further comprises creating, by the processor of the collaboration controller, a collaboration identifier uniquely representing the collaborative communication session.

5. The method of claim 1, further comprising:
   receiving, by the processor of the collaboration controller, from the at least one participant user device, a license request for the collaboration license and wherein transmitting, by the processor of the collaboration controller, to the licensing server the license request is based on receiving the license request from the at least one participant user device; and
   transmitting, by the processor of the collaboration controller, to the participant user device, the collaboration license received from the licensing server.

6. The method of claim 1, wherein requesting initiation of the application for use on the at least one participant user device comprises requesting initiation of an application instance of the application on the at least one participant user device.

7. The method of claim 1, further comprising initially creating, by the processor of the collaboration controller, the collaboration license authorizing usage of the application on the at least one participant user device.

8. The method of claim 1, further comprising not authorizing, by the processor of the collaboration controller, usage of the application on any devices not participating in the collaborative communication session based on the collaboration license.

9. The method of claim 1, further comprising not authorizing, by the processor of the collaboration controller, usage of the application on the at least one participant user device after the collaborative communication session has ended based on the collaboration license.

10. The method of claim 1, further comprising not authorizing, by the processor of the collaboration controller, usage of the application on the at least one participant user device after the at least one participant user device ceases participating in the collaborative communication session based on the collaboration license.

11. The method of claim 1, further comprising authorizing, by the processor of the collaboration controller, usage of the application on the at least one participant user device within the collaborative communication session based on the collaboration license.

12. The method of claim 1, further comprising not authorizing, by the processor of the collaboration controller, usage of the application on the at least one participant user device outside the collaborative communication session based on the collaboration license.

13. The method of claim 1, further comprising authorizing, by the processor of the collaboration controller, usage of the application on the at least one participant user device for a duration of the collaborative communication session based on the collaboration license.

14. The method of claim 13, further comprising authorizing, by the processor of the collaboration controller, usage of the application on the at least one participant user device for only the duration of the collaborative communication session based on the collaboration license.

15. The method of claim 1, further comprising authorizing, by the processor of the collaboration controller, usage of the application when started during the collaborative communication session after the collaboration has ended until execution of the application is terminated based on the collaboration license.

16. A collaboration controller, comprising:
a communications interface to communicate with a network; and
a control system coupled to the communications interface, the control system comprising a processor that is programmed to:
initiate a collaborative communication session among a plurality of participant user devices on the network, the collaborative communication session comprising a real-time information exchange between the plurality of participant user devices and concurrent use of an application by each of the plurality of participant user devices during the collaborative communication session;
determine whether each of the plurality of participant user devices in the collaborative communication session is licensed to use the application;
in response to determining that at least one participant user device of the plurality of participant user devices in the collaborative communication session is not licensed to use the application, transmit, to a licensing server through the communications interface, a license request for a collaboration license authorizing usage of the application on the at least one participant user device determined not to be licensed to use the application;
receive, from the licensing server through the communications interface, the collaboration license authorizing usage of the application on the at least one participant user device for a period of time that ends no later than at an end time of the collaborative communication session;
provide the collaboration license to the at least one participant user device, wherein the at least one participant user device requests validation of the collaboration license from the licensing server; and
request initiation of the application for use on the at least one participant user device based on the collaboration license, wherein requesting initiation of the application for use on the at least one participant user device comprises requesting initiation of an application instance on a virtualization server for each participant user device among the plurality of participant user devices participating in the collaborative communication session, each application instance configured to provide display and control of the application instance to a different participant user device participating in the collaborative communication session.

17. The collaboration controller of claim 16, wherein the collaboration controller is a focus of the collaborative communication session.

18. A non-transitory computer-readable medium comprising a set of instructions stored therein which, when executed by a processor, causes the processor to license an application by:
initiating, by a processor of a collaboration controller, a collaborative communication session among a plurality of participant user devices, the collaborative communication session comprising a real-time information exchange between the plurality of participant user devices and concurrent use of the application by each of the plurality of participant user devices during the collaborative communication session;
determining, by the processor of the collaboration controller, whether each of the plurality of participant user devices in the collaborative communication session is licensed to use the application;
in response to determining that at least one participant user device of the plurality of participant user devices in the collaborative communication session is not licensed to use the application, transmitting, by the processor of the collaboration controller, to a licensing server, a license request for a collaboration license authorizing usage of the application on the at least one participant user device determined not to be licensed to use the application;
receiving, by the processor of the collaboration controller, from the licensing server, the collaboration license authorizing usage of the application on the at least one participant user device for a period of time that ends no later than at the end time of the collaborative communication session;
providing, by the processor of the collaboration controller, the collaboration license to the at least one participant user device, wherein the at least one participant user device requests validation of the collaboration license from the licensing server; and
requesting, by the processor of the collaboration controller, initiation of the application for use on the at least one participant user device based on the collaboration license, wherein requesting initiation of the application for use on the at least one participant user device comprises requesting initiation of an application instance on a virtualization server for each participant user device among the plurality of participant user devices participating in the collaborative communication session, each application instance configured to provide display and control of the application instance to a different participant user device participating in the collaborative communication session.

* * * * *